US011000795B2

(12) United States Patent
Yeh et al.

(10) Patent No.: US 11,000,795 B2
(45) Date of Patent: May 11, 2021

(54) FRACTIONATION SYSTEM USING COMPACT CO-CURRENT CONTACTING SYSTEMS

(71) Applicants: Norman K. Yeh, Shenandoah, TX (US); Edward J. Grave, Montgomery, TX (US); Shwetha Ramkumar, Cypress, TX (US); Juan C. Juarez, Shenandoah, TX (US)

(72) Inventors: Norman K. Yeh, Shenandoah, TX (US); Edward J. Grave, Montgomery, TX (US); Shwetha Ramkumar, Cypress, TX (US); Juan C. Juarez, Shenandoah, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 449 days.

(21) Appl. No.: 15/964,866

(22) Filed: Apr. 27, 2018

(65) Prior Publication Data

US 2018/0361307 A1    Dec. 20, 2018

Related U.S. Application Data

(60) Provisional application No. 62/520,213, filed on Jun. 15, 2017.

(51) Int. Cl.
*B01D 53/14*    (2006.01)
*B01D 53/18*    (2006.01)
(Continued)

(52) U.S. Cl.
CPC ......... *B01D 53/1406* (2013.01); *B01D 3/143* (2013.01); *B01D 53/1487* (2013.01);
(Continued)

(58) Field of Classification Search
CPC .............. B01D 3/143; B01D 53/1406; B01D 53/1487; B01D 53/18; C10L 2290/545; C10L 3/101
See application file for complete search history.

(56) References Cited

U.S. PATENT DOCUMENTS

| 1,951,647 A | 3/1934 | Cooke ............................ 196/46 |
| 2,847,200 A | 8/1958 | Ung ............................ 202/158 |

(Continued)

FOREIGN PATENT DOCUMENTS

| CA | 2144585 | 6/1996 | ............. B01D 53/52 |
| DE | 10162457 | 7/2003 | ............... B01D 3/32 |

(Continued)

OTHER PUBLICATIONS

U.S. Appl. No. 62/548,171, filed Aug. 21, 2017, Denton, Robert D. et al.

(Continued)

*Primary Examiner* — Cabrena Holecek
(74) *Attorney, Agent, or Firm* — ExxonMobil Upstream Research Company-Law Department

(57) ABSTRACT

A fractionation system for removing heavy hydrocarbons in a gas stream. A stripping section receives a predominantly liquid phase of a feed gas stream. First and second co-current contacting systems are located in-line within a pipe. The first co-current contacting system receives a predominantly vapor phase of the feed gas stream. Each co-current contacting system includes a co-current contactor and a separation system. Each co-current contactor includes a droplet generator and a mass transfer section. The droplet generator generates droplets from a liquid and disperses the droplets into a gas stream. The mass transfer section pro- (Continued)

vides a mixed, two-phase flow having a vapor phase and a liquid phase. The separation system separates the vapor phase from the liquid phase.

18 Claims, 7 Drawing Sheets

(51) Int. Cl.
    *C10L 3/10*           (2006.01)
    *B01D 3/14*          (2006.01)

(52) U.S. Cl.
    CPC .............. *B01D 53/18* (2013.01); *C10L 3/101* (2013.01); *C10L 2290/545* (2013.01)

(56) References Cited

U.S. PATENT DOCUMENTS

| | | | |
|---|---|---|---|
| 3,767,766 A | 10/1973 | Tjoa et al. .................. 423/220 |
| 3,773,472 A | 11/1973 | Hausberg et al. ............ 422/169 |
| 3,989,811 A | 11/1976 | Hill ............................. 423/573 |
| 4,073,832 A | 2/1978 | McGann ..................... 261/118 |
| 4,204,934 A | 5/1980 | Warren et al. ............... 204/186 |
| 4,318,717 A | 3/1982 | Sohier .......................... 55/71 |
| 4,369,167 A | 1/1983 | Weir, Jr. ...................... 423/210 |
| 4,405,580 A | 9/1983 | Stogryn et al. .............. 423/226 |
| 4,421,725 A | 12/1983 | Dezael et al. ............... 423/228 |
| 4,589,896 A | 5/1986 | Chen et al. .................... 62/28 |
| 4,603,035 A | 7/1986 | Connell et al. .............. 423/226 |
| 4,678,648 A | 7/1987 | Wynn .......................... 423/228 |
| 4,701,188 A | 10/1987 | Mims ............................ 55/20 |
| 4,752,307 A | 6/1988 | Asmus et al. .................. 55/73 |
| 4,824,645 A | 4/1989 | Jones et al. ................. 423/226 |
| 4,885,079 A | 12/1989 | Eppig et al. ................. 208/13 |
| 5,067,971 A | 11/1991 | Bikson et al. .................. 55/16 |
| 5,085,839 A | 2/1992 | Scott et al. .................. 423/210 |
| 5,091,119 A | 2/1992 | Biddulph et al. ........... 261/114.3 |
| 5,093,094 A | 3/1992 | Van Kleek et al. .......... 423/224 |
| 5,186,836 A | 2/1993 | Gauthier et al. ............ 210/512.1 |
| 5,209,821 A | 5/1993 | Shaw et al. .................. 159/4.01 |
| 5,439,509 A | 8/1995 | Spink et al. .................. 95/166 |
| 5,462,584 A | 10/1995 | Gavlin et al. ................ 95/231 |
| 5,603,908 A | 2/1997 | Yoshida et al. .............. 423/220 |
| 5,648,053 A | 7/1997 | Mimura et al. .............. 423/210 |
| 5,664,426 A | 9/1997 | Lu ................................. 62/93 |
| 5,713,985 A | 2/1998 | Hamilton ..................... 95/90 |
| 5,735,936 A | 4/1998 | Minkkinen et al. ........... 95/49 |
| 5,810,897 A | 9/1998 | Konosu ........................ 55/418 |
| 5,837,105 A | 11/1998 | Stober et al. ................ 203/40 |
| 5,907,924 A | 6/1999 | Collin et al. .................. 45/194 |
| 5,988,283 A | 11/1999 | Gann ........................... 166/357 |
| 6,063,163 A | 5/2000 | Carmody ..................... 95/187 |
| 6,071,484 A | 6/2000 | Dingman et al. ............ 423/229 |
| 6,089,317 A | 7/2000 | Shaw ........................... 166/265 |
| 6,214,097 B1 | 4/2001 | Laslo ............................ 96/236 |
| 6,228,145 B1 | 5/2001 | Falk-Pedersen et al. ......... 95/44 |
| 6,284,023 B1 | 9/2001 | Torkildsen et al. ............. 95/216 |
| 6,830,608 B1 | 12/2004 | Peters .......................... 261/112 |
| 6,881,389 B2 | 4/2005 | Paulsen et al. ............... 423/210 |
| 7,018,451 B1 | 3/2006 | Torkildsen et al. ............. 95/216 |
| 7,128,276 B2 | 10/2006 | Nilsen et al. ................ 236/124 |
| 7,144,568 B2 | 12/2006 | Ricard et al. ................ 423/659 |
| 7,152,431 B2 | 12/2006 | Amin et al. .................. 62/637 |
| 7,175,820 B2 | 2/2007 | Minkkinen et al. .......... 423/228 |
| RE39,826 E | 9/2007 | Lu ................................. 62/632 |
| 7,273,513 B2 | 9/2007 | Linga et al. .................. 95/235 |
| 7,560,088 B2 | 7/2009 | Keller et al. ................ 423/537.1 |
| 7,811,343 B2 | 10/2010 | Toma .......................... 55/318 |
| 8,071,046 B2 | 12/2011 | Hassan et al. ............... 422/225 |
| 8,137,444 B2 | 3/2012 | Farsad et al. ................. 96/235 |
| 8,240,640 B2 | 8/2012 | Nakayama .................. 261/109 |
| 8,268,049 B2 | 9/2012 | Davydov ..................... 95/199 |
| 8,336,863 B2 | 12/2012 | Neumann et al. ............ 261/115 |
| 8,343,360 B2 | 1/2013 | Schook ........................ 210/788 |
| 8,454,727 B2 | 6/2013 | Dunne et al. .................. 95/51 |
| 8,475,555 B2 | 7/2013 | Betting et al. ................ 55/416 |
| 8,652,237 B2 | 2/2014 | Heldebrant et al. ............ 95/235 |
| 8,741,127 B2 | 6/2014 | Koseoglu et al. ............... 20/57 |
| 8,899,557 B2 | 12/2014 | Cullinane et al. ............. 96/234 |
| 8,900,347 B2 | 12/2014 | Boulet et al. ................. 95/114 |
| 9,149,761 B2 | 10/2015 | Northrop et al. ............. 166/401 |
| 9,192,896 B2 | 11/2015 | Hassan et al. ....... B01F 7/00766 |
| 9,238,193 B2 | 1/2016 | Ji et al. ............... B01D 53/1468 |
| 9,353,315 B2 | 5/2016 | Heath et al. ............ C10G 5/06 |
| 9,599,070 B2 | 3/2017 | Huntington et al. ............. 60/39 |
| 9,764,252 B2 | 9/2017 | Whitney et al. ... B01D 17/0217 |
| 9,902,914 B2 | 2/2018 | Mak ........................ C10L 3/104 |
| 2001/0037876 A1 | 11/2001 | Oost et al. .................... 165/133 |
| 2003/0005823 A1 | 1/2003 | LeBlanc et al. ............... 95/149 |
| 2003/0155438 A1 | 8/2003 | Boee et al. ................. 239/533.2 |
| 2004/0092774 A1 | 5/2004 | Mimura et al. .............. 564/497 |
| 2005/0006086 A1 | 1/2005 | Gramme .................... 166/105.5 |
| 2006/0123993 A1 | 6/2006 | Henriksen ...................... 96/234 |
| 2006/0185320 A1 | 8/2006 | Dureiko ......................... 52/749 |
| 2007/0205523 A1 | 9/2007 | Kojima ....................... 261/79.2 |
| 2008/0006011 A1 | 1/2008 | Larnholm et al. ............. 55/421 |
| 2008/0107581 A1 | 5/2008 | Sparling et al. .............. 423/222 |
| 2008/0115532 A1 | 5/2008 | Jager ............................. 62/620 |
| 2008/0190291 A1 | 8/2008 | Krehbiel et al. ............... 95/241 |
| 2008/0257788 A1 | 10/2008 | Leito .............................. 209/44 |
| 2008/0290021 A1 | 11/2008 | Buijs et al. ................. 210/500.27 |
| 2009/0213687 A1 | 8/2009 | Linga et al. ................ 366/167.2 |
| 2009/0241778 A1 | 10/2009 | Lechnick et al. ............... 95/177 |
| 2010/0229725 A1 | 9/2010 | Farstad et al. .................. 96/74 |
| 2011/0036122 A1 | 2/2011 | Betting et al. ................ 62/636 |
| 2011/0168019 A1 | 7/2011 | Northrop et al. ............. 95/186 |
| 2011/0185633 A1 | 8/2011 | Betting et al. ............. 48/127.5 |
| 2011/0217218 A1 | 9/2011 | Gupta .......................... 423/228 |
| 2011/0296869 A1 | 12/2011 | Buhrman et al. .............. 62/617 |
| 2012/0060691 A1 | 3/2012 | Bieri et al. .................... 95/270 |
| 2012/0204599 A1 | 8/2012 | Northrop et al. .............. 62/617 |
| 2012/0240617 A1 | 9/2012 | Weiss et al. ................... 62/611 |
| 2013/0017144 A1 | 1/2013 | Menzel ........................ 423/542 |
| 2014/0033921 A1 | 2/2014 | Peck et al. ..................... 95/269 |
| 2014/0123851 A1 | 5/2014 | Jamtvedt et al. ............... 95/149 |
| 2014/0245889 A1 | 9/2014 | Hamre et al. .................. 95/223 |
| 2014/0331862 A1 | 11/2014 | Cullinane et al. .............. 95/186 |
| 2014/0335002 A1 | 11/2014 | Northrop et al. ............. 423/228 |
| 2014/0366446 A1 | 12/2014 | Sharma et al. ............. 48/127.3 |
| 2014/0373714 A1 | 12/2014 | Cloud et al. ................... 95/273 |
| 2015/0013539 A1 | 1/2015 | Eriksen et al. ................. 95/172 |
| 2015/0083425 A1 | 3/2015 | Sullivan et al. |
| 2015/0135954 A1 | 5/2015 | Li et al. |
| 2015/0191360 A1 | 7/2015 | Weiss et al. ............ C01B 31/20 |
| 2015/0267871 A1 | 9/2015 | Murray, Sr. et al. ..... F17D 3/01 |
| 2015/0322580 A1 | 11/2015 | Little ........................... 205/554 |
| 2015/0352463 A1* | 12/2015 | Grave ..................... C07C 7/11 |
| | | 203/14 |
| 2016/0060190 A1 | 3/2016 | Trucko et al. .......... C07C 7/005 |
| 2016/0136569 A1 | 5/2016 | Lee et al. .............. B01D 53/18 |
| 2016/0199774 A1 | 7/2016 | Grave et al. ................... 95/235 |
| 2016/0236140 A1 | 8/2016 | Northrop et al. .............. 95/210 |
| 2016/0263516 A1 | 9/2016 | Freeman et al. ............... 95/236 |
| 2016/0288045 A1 | 10/2016 | Kramer et al. ...... B01D 53/1493 |
| 2017/0145803 A1 | 5/2017 | Yeh et al. ................. E21B 43/36 |
| 2017/0157553 A1 | 6/2017 | Northrop et al. .............. 96/314 |
| 2017/0184021 A1 | 6/2017 | Huntington ..................... 60/39 |
| 2017/0239612 A1 | 8/2017 | Mondkar et al. ............ 423/220 |
| 2018/0071674 A1 | 3/2018 | Freeman et al. ............. 423/228 |
| 2018/0361307 A1 | 12/2018 | Yeh et al. .......... B01D 53/1406 |
| 2018/0361309 A1 | 12/2018 | Yeh et al. ............ B01D 53/185 |
| 2018/0362858 A1 | 12/2018 | Ramkumar et al. .................... |
| | | C10G 25/003 |

FOREIGN PATENT DOCUMENTS

| | | | |
|---|---|---|---|
| EP | 0191985 | 8/1986 | ............ B01D 53/18 |
| EP | 0301623 | 2/1989 | ............ B01D 53/14 |
| EP | 1438484 | 4/2003 | ............ B01D 17/02 |
| EP | 1141520 | 5/2003 | ............ E21B 43/40 |
| EP | 1340536 | 9/2003 | ............ B01J 19/30 |
| EP | 2134446 | 9/2015 | ............ B01D 54/04 |
| GB | 1234862 | 6/1971 | ............ B01D 53/18 |
| GB | 1377026 | 12/1974 | ............ B01D 47/10 |

(56) References Cited

FOREIGN PATENT DOCUMENTS

| | | | |
|---|---|---|---|
| GB | 1579249 | 11/1980 | ............... H01J 1/13 |
| GB | 2079177 | 1/1982 | ............ B01D 53/18 |
| GB | 2094951 | 9/1982 | ............... F22B 3/04 |
| GB | 2414688 | 12/2006 | ............ B01D 53/26 |
| JP | 48-066073 | 9/1971 | ............ B01D 47/10 |
| JP | 53-032109 | 3/1978 | ............... A61K 9/08 |
| JP | 06-170153 | 12/1992 | ............ B01D 53/34 |
| JP | 2014-000500 | 1/2014 | ............ B01D 53/14 |
| WO | WO1993/010883 | 6/1993 | ............ B01D 53/14 |
| WO | WO1997/046304 | 12/1997 | ............ B01D 53/26 |
| WO | WO1999/013966 | 3/1999 | ............ B01D 53/18 |
| WO | WO2000/056844 | 9/2000 | ............... C10L 3/10 |
| WO | WO2002/032536 | 4/2002 | ............ B01D 17/00 |
| WO | WO2003/072226 | 9/2003 | ............ B01D 53/14 |
| WO | WO2004/070297 | 8/2004 | ............... F25J 3/06 |
| WO | WO2009/140993 | 11/2009 | ............ B01D 45/16 |
| WO | WO2013/136310 | 9/2013 | ............ B01D 53/14 |
| WO | WO2014/042529 | 3/2014 | |
| WO | WO2014/094794 | 6/2014 | ............ B01D 17/04 |
| WO | WO2014/106770 | 7/2014 | |
| WO | WO2015/013539 | 1/2015 | ............ H04W 52/36 |
| WO | WO2015/105438 | 7/2015 | ............ B01D 53/14 |
| WO | WO2015/167404 | 11/2015 | ............ B01D 53/22 |
| WO | WO2016/064825 | 4/2016 | ............ B01D 53/48 |

OTHER PUBLICATIONS

U.S. Appl. No. 62/548,172, filed Aug. 21, 2017, Denton, Robert D. et al.
Carter, T. et al. (1998) "Addition of Static Mixers Increases Capacity in Central Texas Gas Plant," *Proc. of the 77th GPA Annual Conv.*, pp. 110-113.
Dow Chemical Company (Mar. 3, 2015) "Product Safety Assessment," *SELEXOL Solvents Product Brochure*, 3 pages.
Garrison, J. et al. (2002) "Keyspan Energy Canada Rimbey Acid Gas Enrichment with FLEXSORB SE Plus Technology," *Proceedings 2002 Laurance Reid Gas Conditioning Conf.*, Norman, OK, 8 pgs.
Hanna, James M. (2009) "Qatargas Expansion Projects: Why Change the Gas Treating Concept from Sulfinol-D?," *OSGAT 2009 Proceedings 5th Int'l Conf.*, Mar. 31-Apr. 1, Abu Dhabi, UAE, 33 pgs.
Jones, S. G. et al. (2004) "Design, Cost & Operation of an Acid Gas Enrichment & Injection Facility," *Proceedings 2004 Laurance Reid Gas Conditioning Conf.*, Norman, OK, 43 pgs.
Linga, H. et al. (2001) "New Selective $H_2S$ Removal Process for the Refining Industry," *Nat'l Petrochemical & Refiners Assoc.*, AM-01-35, 9 pgs.
Linga, H. et al. (2006) "Potentials and Applications for the Pro-Pure Co-Current Contactors," *13th Annual India Oil & Gas Rev. Symp.*, Mumbai, India, 24 pgs.
Nilsen, F. et al. (2001) "Selective $H_2S$ Removal in 50 Milliseconds," *Gas Processors Assoc., Europe Annual Conference*, 12 pgs.
Nilsen, F. et al. (2002) "Novel Contacting Technology Selectively Removes $H_2S$," *Oil & Gas Journal.*, 17 pgs.
Nilsen, F. et al. (2002) "Selective $H_2S$ Removal Applications using Novel Contacting Technology," *Gas Processors Assoc.*, 13 pgs.
Nova Molecular Technologies, Inc. (Jul. 17, 2008) "Product Brochure," *FLEXSORB SE*, 1 page.
ProSep, Inc. (2007) "Selective $H_2S$-Removal with Amines (ProCap)," *Product Brochure*, 32 pgs.
ProSep, Inc. (2014) "ProDry," *Gas Portfolio Product Brochure*, 1 pg.
ProSep, Inc. (2014) "ProScav," *Gas Portfolio Product Brochure*, 1 pg.
Puukilainen, E. et al. (2007) "Superhydrophobic Polyolefin Surfaces: Controlled Micro- an Nanostructures," *Dept. of Chemistry, Univ. of Joensuu*, Langmuir, v. 23, No. 13, pp. 7263-7268.
Royan, T. et al. (1992) "Acid Gas Enrichment using FLEXSORB," *Proceedings 1992 Laurance Reid Gas Conditioning Conf.*, Norman, OK, Mar. 2-4, 17 pgs.
Schutte & Koerting (2012) "Gas Scrubbers," *Product Brochure*, 14 pgs.
Smith, W. B. (2010) "Typical Amine and Glycol Treating Unit Compared to Gas Membrane Separation System for Wellhead $CO_2$ Trimming," *Laurance Reid Gas Conditioning Conf.*, Norman, OK, Feb. 21-24, 2010, pp. 417-436.
True, Warran R. (1994) "New Mobile Bay Complex Exploits Major Sour Gas Reserve," *Oil & Gas Journal*, v. 92, No. 21, 4 pgs.
Weiland, R. H. (2008) "Acid Gas Enrichment—Maximizing Selectivity," *Proceedings 2008 Laurance Reid Gas Conditioning Conf.*, Clarita, OK, 16 pgs.

\* cited by examiner

FRACTIONATION SYSTEM USING COMPACT CO-CURRENT CONTACTING SYSTEMS

CROSS-REFERENCE TO RELATED APPLICATIONS

This application claims the priority benefit of U.S. Patent Application No. 62/520,213 filed Jun. 15, 2017 entitled FRACTIONATION SYSTEM USING COMPACT CO-CURRENT CONTACTING SYSTEMS, the entirely of which is incorporated b reference herein.

This application is related to U.S. Provisional Application No. 62/520,274 entitled "Fractionation System Using Bundled Compact Co-Current Contacting Systems", filed on an even date and having a common assignee herewith, the disclosure of which is incorporated by reference herein in its entirety.

FIELD

The present techniques provide methods and systems for fractionating one or more components from a gas stream. More specifically, the present techniques provide for methods and systems to remove heavy hydrocarbons from a natural gas stream during a liquefaction process.

BACKGROUND

This section is intended to introduce various aspects of the art, which can be associated with exemplary examples of the present techniques. This description is believed to assist in providing a framework to facilitate a better understanding of particular aspects of the present techniques. Accordingly, it should be understood that this section should be read in this light, and not necessarily as admissions of prior art.

Numerous applications within the upstream and downstream oil and gas industry use absorption and fractionation columns for a variety of processes including, for example, dehydration for water removal from hydrocarbon gas, amine treating for acid gas removal from hydrocarbon gas and fractionation of hydrocarbons. One application of hydrocarbons fractionation is the fractionation column—also known as a scrub column—in a typical LNG process. FIG. 1 illustrates a known scrub column 100 that may be used in such an LNG process. According to known LNG processes, gas fed to the scrub column is first pre-treated and cooled. The scrub column typically operates at high pressure. The main objective of the scrub column is to remove most of the heavy hydrocarbons, such as pentane, from the natural gas stream. The traditional scrub column 100 includes a bottom section, also known as a stripping section 102, and a top section, also known as a rectification section 104. A gas stream 108 enters the scrub column 100 at high pressure and at a position adjacent both the stripping section 102 and the rectification section 104. The vapor and liquid in the gas stream separate from each other, with the vapor moving upward into the rectification section 104 and the liquid moving downward into the stripping section 102. The stripping section 102 uses trays 110 to separate and direct liquid downward. Trays 110 are typically used instead of packing because of anticipated high liquid flux, which is defined as a volumetric flow per unit area.

A liquid stream 112 is extracted near the bottom of the scrub column 100 and is re-heated in a reboiler 114. The reheated stream 116 is returned to the stripping section 102, where vapors in the reheated stream can rise through the stripping section and enter the rectification section 104. Liquids in the reheated stream 116 combine with other liquids at the bottom of the scrub column 100. A scrub column liquid bottoms stream 117 may be taken from the bottom of the scrub column.

Vapors from the gas stream 108 combine with vapors rising from the stripping section 102 and pass into the rectification section 104, where they contact liquid descending the column. In the rectification section 104, packing 118 is typically used instead of trays because of the low liquid circulation rate. The rectification section 104 includes several theoretical separation stages (typically two to four) where, based on the different boiling points of the components in the stream going to that separation stage, the fractionation/separation of hydrocarbons takes place. The packing in each section promotes intimate contact and mass transfer between the liquid and vapor. A vapor stream 122 exits the top of the scrub column 100 and is cooled in a reflux cooler system 124, which may include one or more heat exchangers or other coolers. The cooled vapor stream 126 is sent to a reflux drum 128 where liquids and vapor are separated from each other. A reflux liquid stream 130 is returned to a top portion of the scrub column, while the reflux vapor stream 132 exiting the reflux drum 128 is sent for further processing, which may include the remainder of a natural gas liquefaction process. Vapor rising in the scrub column 100 gets richer in the lighter hydrocarbons components and the liquid descending the column gets richer in the heavier hydrocarbons components. Therefore, the scrub column liquid bottoms stream 117 is proportionally higher in heavier hydrocarbons components than in lighter hydrocarbons components, and the reflux vapor stream 132 is proportionally higher in lighter hydrocarbons components than in heavier hydrocarbons components.

Typically, the diameter of the rectification section 104 of the scrub column 100 is much larger than the diameter of the stripping section 102 because of the high gas flow rate through the rectification section. Therefore, due to its size, pressure, and material selection due to cold temperatures, the rectification section controls the cost and weight of the scrub column, which in some applications may be substantial. The size and weight of the fractionation column may limit its application in populated areas where height must be minimized for visual population reasons. Additionally, applications where size and weight are critical design factors, such as offshore LNG processing, can be limited by the size and weight of such a large fractionation column. What is needed is a method and apparatus for removing heavy hydrocarbons from a natural gas stream that eliminates the large, heavy, and costly rectification section of a fractionation column.

Besides height and weight considerations, the theory of operation of a typical fractionation column may itself be a limiting design factor. The fractionation process requires a certain amount of liquid to interact with the incoming gas stream, and in the process shown in FIG. 1 this liquid is designed to come from the fractionation process itself. This can pose difficulties for applications when relatively small amounts of heavy hydrocarbons are present in a natural gas stream to be liquefied. Additionally, it may not be economically feasible to install an additional fractionation column in a pre-existing facility, such as an LNG facility, for de-bottlenecking purposes. What is needed is a method and apparatus for removing heavy hydrocarbons from a natural gas stream that can be used in applications having low liquid circulation rates. What is also needed is a method and apparatus for removing heavy hydrocarbons from a natural gas stream that can be economically used in debottlenecking applications.

SUMMARY

The disclosed aspects include a fractionation system for removing heavy hydrocarbons in a gas stream. A feed gas stream is introduced through a feed gas stream inlet. A stripping section receives a predominantly liquid phase of the feed gas stream. First and second co-current contacting systems are located in-line within a pipe. The first co-current contacting system receives a predominantly vapor phase of the feed gas stream. Each of the first and second co-current contacting systems includes a co-current contactor and a separation system. Each co-current contactor includes a droplet generator and a mass transfer section. The droplet generator generates droplets from a liquid and disperses the droplets into a gas stream. The mass transfer section provides a mixed, two-phase flow having a vapor phase and a liquid phase. The separation system separates the vapor phase from the liquid phase. The vapor phase of the co-current contactor in the first co-current contacting system comprises the gas stream for the co-current contactor in the second co-current contacting system. The liquid phase of the co-current contactor in the second co-current contacting system comprises the liquid from which droplets are generated in the co-current contactor of the first co-current contacting system.

The disclosed aspects also include a method of removing heavy hydrocarbons in a gas stream. According to the method, a feed gas stream is introduced into a feed gas inlet. A predominantly liquid phase of the feed gas stream is received into a stripping section. A predominantly vapor phase of the feed gas stream is received into a first co-current contacting system located in-line within a pipe with a second co-current contacting system. Each of the first and second co-current contacting systems includes a co-current contactor including a droplet generator and a mass transfer section, and a separation system. Using each droplet generator, droplets are generated from a liquid and the droplets are dispersed into a gas stream. In each mass transfer section a mixed, two-phase flow is provided having a vapor phase and a liquid phase. In each separation system, the vapor phase is separated from the liquid phase. The vapor phase of the co-current contactor in the first co-current contacting system comprises the gas stream for the co-current contactor in the second co-current contacting system. The liquid phase of the co-current contactor in the second co-current contacting system comprises the liquid from which droplets are generated in the co-current contactor of the first co-current contacting system.

The disclosed aspects further include a fractionation system for removing heavy hydrocarbons in a gas stream. A feed gas stream, comprising a natural gas stream, is introduced through a feed gas inlet. A stripping section receives a predominantly liquid phase of the feed gas stream. First and second co-current contacting systems are located in-line within a pipe. The first co-current contacting system receives a predominantly vapor phase of the feed gas stream. Each of the first and second co-current contacting systems include a co-current contactor and a separation system. Each co-current contactor includes a droplet generator and a mass transfer section. Each droplet generator generates droplets from a liquid and disperses the droplets into a gas stream. The mass transfer section provides a mixed, two-phase flow having a vapor phase and a liquid phase. Each droplet generator includes an annular support ring securing the droplet generator in-line within the pipe, a plurality of spokes extending from the annular support ring, the annular support ring having a plurality of liquid channels configured to allow a liquid stream to flow through the plurality of spokes and out of injection orifices disposed on the plurality of spokes. Each droplet generator also includes a gas entry cone supported by the plurality of spokes and configured to allow a first portion of a gas stream to flow through a hollow section of the gas entry cone and through gas exit slots included in the plurality of spokes, and a second portion of the gas stream to flow around the gas entry cone and between the plurality of spokes, wherein the second portion of the gas stream is separate from the first portion of the gas stream. The separation system separates the vapor phase from the liquid phase of the respective co-current contactor. The vapor phase of the co-current contactor in the first co-current contacting system comprises the gas stream for the co-current contactor in the second co-current contacting system. The liquid phase of the co-current contactor in the second co-current contacting system comprises the liquid from which droplets are generated in the co-current contactor of the first co-current contacting system. An in-line flash separator receives the predominantly vapor phase of the feed gas stream prior to said predominantly vapor phase being sent through the first co-current contacting system. The in-line flash separator separates liquids from the predominantly vapor phase. A flash reflux line is connected to the in-line flash separator and to the stripping section, the flash reflux line conveying liquids separated from the predominantly vapor phase in the in-line flash separator to the stripping section.

DESCRIPTION OF THE DRAWINGS

The advantages of the present techniques are better understood by referring to the following detailed description and the attached drawings, in which.

DETAILED DESCRIPTION

Figure 1:
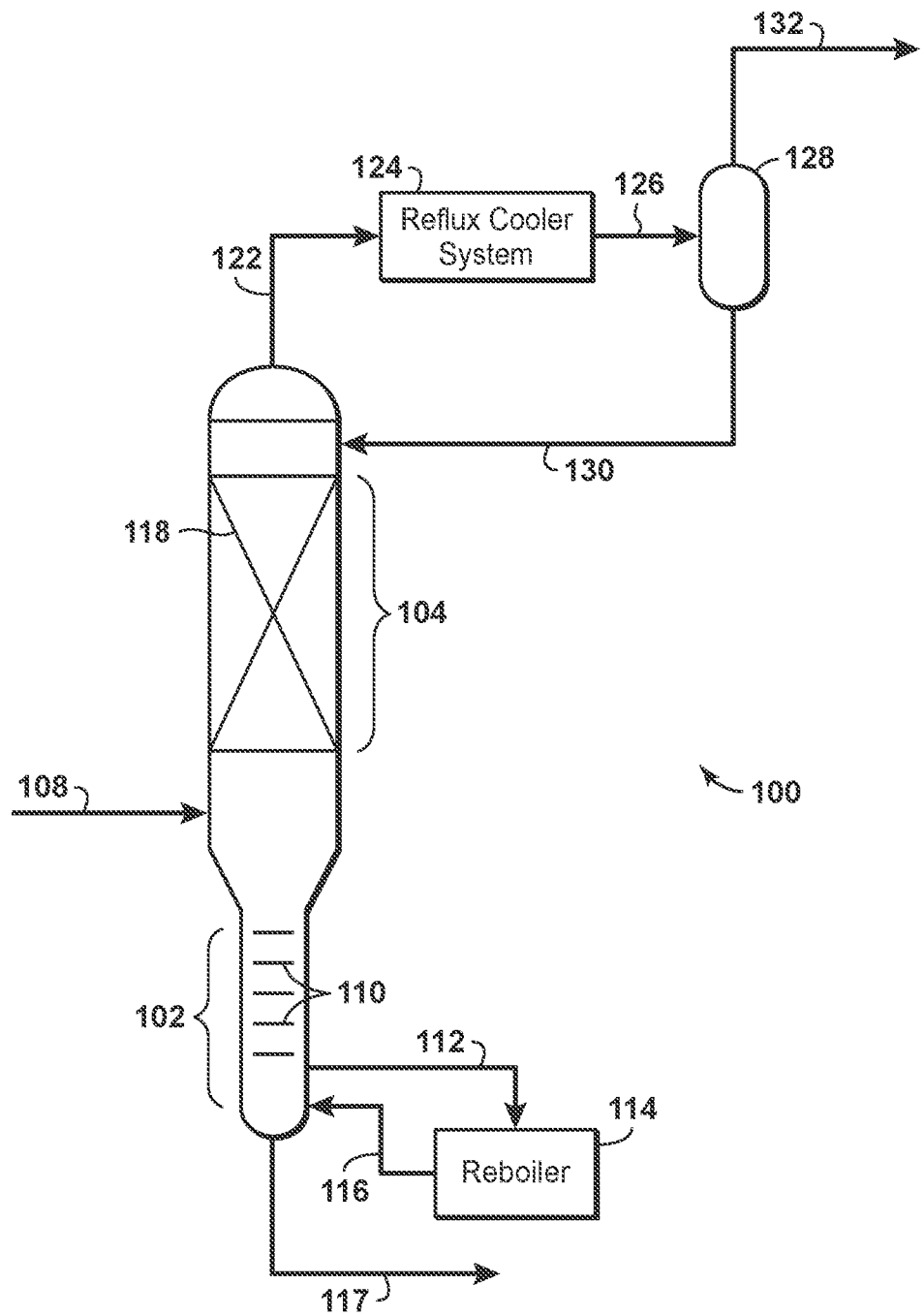
FIG. 1 is a generalized schematic diagram of a prior art gas fractionation system.

In the following detailed description section, non-limiting examples of the present techniques are described. However, to the extent that the following description is specific to a particular example or a particular use of the present techniques, this is intended to be for exemplary purposes only and simply provides a description of the exemplary examples. Accordingly, the techniques are not limited to the specific examples described below, but rather, include all alternatives, modifications, and equivalents falling within the true spirit and scope of the appended claims.

At the outset, for ease of reference, certain terms used in this application and their meanings as used in this context are set forth. Further, the present techniques are not limited by the usage of the terms shown below, as all equivalents, synonyms, new developments, and terms or techniques that serve the same or a similar purpose are considered to be within the scope of the present claims.

"Acid gas" refers to any gas that produces an acidic solution when dissolved in water. Non-limiting examples of acid gases include hydrogen sulfide ($H_2S$), carbon dioxide ($CO_2$), sulfur dioxide ($SO_2$), carbon disulfide ($CS_2$), carbonyl sulfide (COS), mercaptans, or mixtures thereof.

"Co-current contactor" refers to a vessel that receives a gas stream and a separate solvent stream in such a manner that the gas stream and the solvent stream contact one another while flowing in generally the same direction.

The term "co-currently" refers to the internal arrangement of process streams within a unit operation that can be divided into several sub-sections by which the process streams flow in the same direction.

As used herein, a "column" is a separation vessel in which a counter-current flow is used to isolate materials on the basis of differing properties.

As used herein, the term "dehydration" refers to the pre-treatment of a raw feed gas stream to partially or completely remove water and, optionally, some heavy hydrocarbons.

The term "fractionation" refers to the process of physically separating components of a fluid stream into a vapor phase and a liquid phase based on differences in the components' boiling points and vapor pressures at specified temperatures and pressures. Fractionation is typically performed in a "fractionation column," which includes a series of vertically spaced plates. In a typical process, a feed stream enters the fractionation column at a mid-point, dividing the fractionation column into two sections. The top section can be referred to as the rectification section, and the bottom section can be referred to as the stripping section. Condensation and vaporization occur on each plate, causing lower boiling point components to rise to the top of the fractionation column and higher boiling point components to fall to the bottom. A reboiler is located at the base of the fractionation column to add thermal energy. The "bottoms" product is removed from the base of the fractionation column. A condenser is located at the top of the fractionation column to condense the product emanating from the top of the fractionation column, which is called the distillate. A reflux pump is used to maintain flow in the rectification section of the fractionation column by pumping a portion of the distillate back into the distillation column.

As used herein, the term "facility" is used as a general term to encompass oil and gas field gathering systems, processing platform systems, and well platform systems.

The term "gas" is used interchangeably with "vapor," and is defined as a substance or mixture of substances in the gaseous state as distinguished from the liquid or solid state. Likewise, the term "liquid" means a substance or mixture of substances in the liquid state as distinguished from the gas or solid state.

A "hydrocarbon" is an organic compound that primarily includes the elements hydrogen and carbon, although nitrogen, sulfur, oxygen, metals, or any number of other elements can be present in small amounts. As used herein, hydrocarbons generally refer to components found in natural gas, oil, or chemical processing facilities.

A "heavy" hydrocarbon is a hydrocarbon with three or more carbon atoms in each molecule. The precise number of carbon atoms comprising a heavy hydrocarbon molecule may depend on the feed gas and the desired product gas. For example, if methane gas (having one carbon atom per molecule) is the desired product gas, then heavy hydrocarbons may include propane (having three carbon atoms). Examples of heavy hydrocarbons include pentane, hexane, heptane, and the like.

With respect to fluid processing equipment, the term "in series" means that two or more devices are placed along a flow line such that a fluid stream undergoing fluid separation moves from one item of equipment to the next while maintaining flow in a substantially constant downstream direction. Similarly, the term "in line" means that two or more components of a fluid mixing and separating device are connected sequentially or, more preferably, are integrated into a single tubular device. Similarly, the term "in parallel" means that a stream is divided among two or more devices, with a portion of the stream flowing through each of the devices.

The term "stream" indicates a material that is flowing from a first point, such as a source, to a second point, such as a device processing the stream. The stream may include any phase or material, but is generally a gas or liquid. The stream may be conveyed in a line or pipe, and used here, reference to the line or pipe also refers to the stream the line is carrying, and vice versa.

"Natural gas" refers to a multi-component gas obtained from a crude oil well or from a subterranean gas-bearing formation. The composition and pressure of natural gas can vary significantly. A typical natural gas stream contains methane ($CH_4$) as a major component, i.e., greater than 50 mol % of the natural gas stream is methane. The natural gas stream can also contain ethane ($C_2H_6$), heavy hydrocarbons (e.g., $C_3$-$C_{20}$ hydrocarbons), one or more acid gases (e.g., $CO_2$ or $H_2S$), or any combinations thereof. The natural gas can also contain minor amounts of contaminants such as water, nitrogen, iron sulfide, wax, crude oil, or any combinations thereof. The natural gas stream can be substantially purified, so as to remove compounds that may act as poisons.

"Solvent" refers to a substance capable at least in part of dissolving or dispersing one or more other substances, such as to provide or form a solution. The solvent can be polar, nonpolar, neutral, protic, aprotic, or the like. The solvent may include any suitable element, molecule, or compound, such as methanol, ethanol, propanol, glycols, ethers, ketones, other alcohols, amines, salt solutions, ionic liquids, or the like. The solvent may include physical solvents, chemical solvents, or the like. The solvent may operate by any suitable mechanism, such as physical absorption, chemical absorption, or the like.

"Substantial" when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

The present techniques provide for the fractionation of substances from a gas stream, for example removing heavy hydrocarbons from a natural gas stream, using co-current contacting systems. Alternatively, the present techniques provide for the separation of at least a portion of heavy hydrocarbons from a hydrocarbons stream that includes heavy hydrocarbons and light hydrocarbons. The co-current contacting systems disclosed herein include stages composed primarily of in-line devices, or of bundles of parallel in-line devices, in either case the devices and/or the bundles having smaller diameters than a conventional tower.

Known counter-current flow schemes, such as the known scrub column 100 of FIG. 1, require comparatively low velocities to avoid entrainment of the down-flowing liquid in the natural gas stream. Further, relatively long distances are useful for disengagement of the liquid droplets from the raw natural gas stream. Depending on the flow rate of the natural gas stream, the scrub column 100 may be greater than four meters in diameter and more than 30 meters tall. For high-pressure applications, the vessel has thick, metal walls. Consequently, counter-current contactor vessels can be large and very heavy. This is generally undesirable, particularly for offshore liquefaction applications, and may not be feasible for other applications.

The present technological advancement can use a co-current flow scheme as an alternative to the counter-current flow scheme demonstrated in the scrub column 100 of FIG. 1. The co-current flow scheme utilizes one or more co-current contacting systems connected in series within a pipe. A natural gas stream and a liquid reflux stream may move together, i.e., co-currently, within each co-current contacting system. In general, co-current contactors can operate at much higher fluid velocities than counter-current contacting systems. As a result, co-current contacting systems tend to be smaller than counter-current contactors that utilize standard towers with packing or trays. Further, the co-current contacting systems are smaller than conventional pressure vessels of equivalent processing capacity, and are thus more suited to modular design/construction, offshore deployment, de-bottlenecking applications, and applications where visual pollution may be a factor. In natural gas liquefaction application, two to three co-current contacting systems in series can be used to separate heavy hydrocarbons from a natural gas stream.

Figure 2:
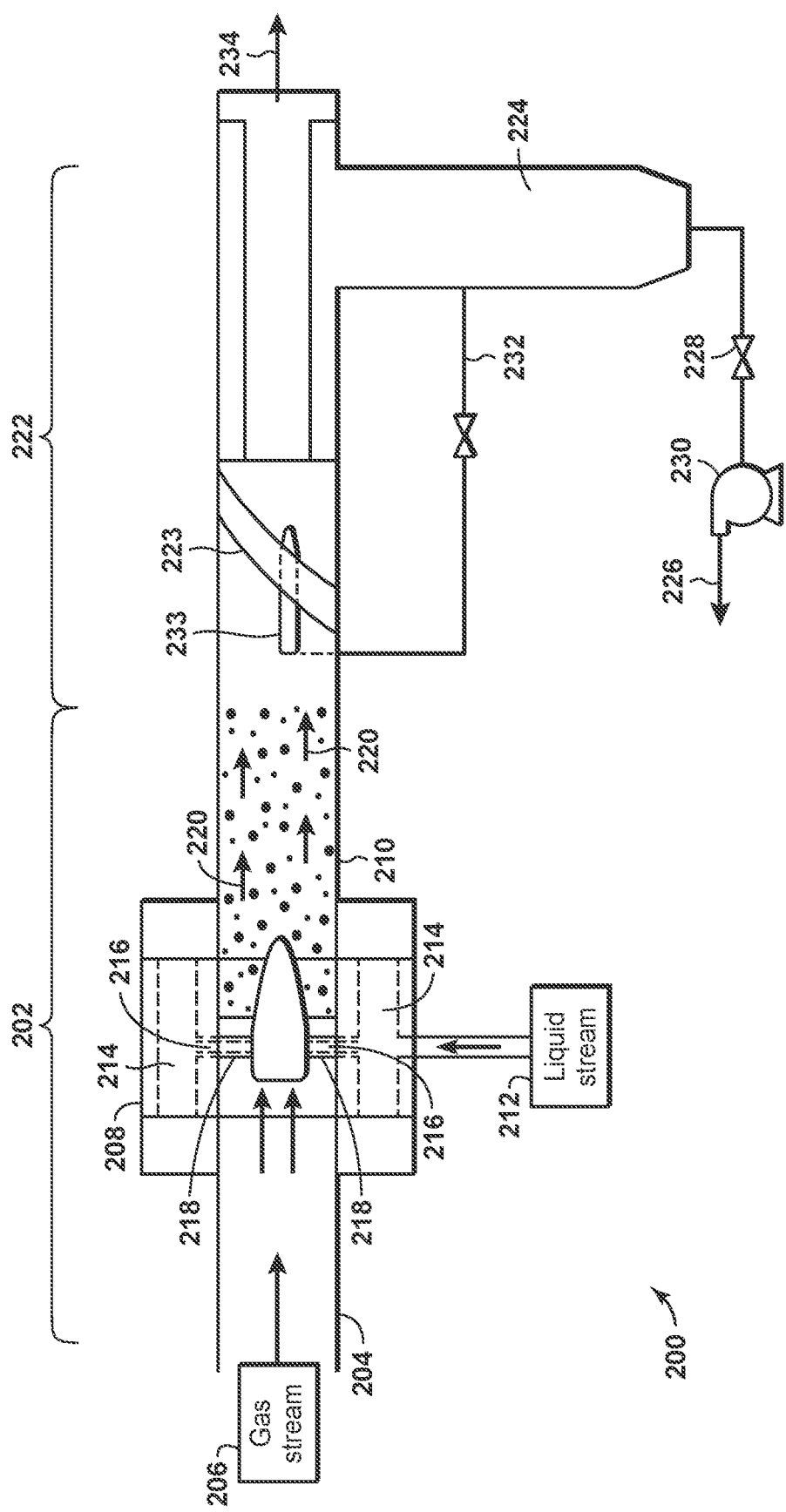
FIG. 2 is a schematic diagram of a co-current contacting system according to disclosed aspects.

FIG. 2 is a schematic of a co-current contacting system (CCCS) 200. The co-current contacting system 200 can provide for the separation of components within a gas stream. The co-current contacting system 200 can include a co-current contactor 202 that is positioned in-line within a pipe 204. The co-current contactor 202 may include a number of components that provide for the efficient contacting of a liquid droplet stream with a flowing gas stream 206. The liquid droplet stream may be used for the separation of impurities, such as heavy hydrocarbons, from a gas stream 206.

The co-current contactor 202 may include a droplet generator 208 and a mass transfer section 210. As shown in FIG. 2, the gas stream 206 may be flowed through the pipe 204 and into the droplet generator 208. A liquid stream 212 may also be flowed into the droplet generator 208, for example, through a hollow space 214 coupled to flow channels 216 in the droplet generator 208.

From the flow channels 216, the liquid stream 212 is released into the gas stream 206 as fine droplets through injection orifices 218, and is then flowed into the mass transfer section 210. This can result in the generation of a treated gas stream 220 within the mass transfer section 210. The treated gas stream 220 may include small liquid droplets dispersed in a gas phase. For fractionation associated with a natural gas liquefaction process, the liquid droplets may include heavy hydrocarbons from the gas stream 206 that were absorbed or dissolved into the liquid stream 212.

The treated gas stream 220 may be flowed from the mass transfer section 210 to a separation system 222, which includes a cyclonic separator 223 and a collector 224. Alternatively the separation system may include a mesh screen, or a settling vessel. Preferably, in-line cyclonic separators may be used to realize the benefits of compactness and reduced diameter. The cyclonic separator 223 removes the liquid droplets from the gas phase. The liquid droplets, which as previously stated may include heavy hydrocarbons 206 absorbed or dissolved into the liquid stream 212, are diverted into collector 224, which directs the collected liquids stream 226 through a valve 228 and pump 230 to other portions of the disclosed aspects as will be further described herein. A gas purge line 232 extends from the collector 224 and operates to re-inject gas present in the collector into the separation system 222. In an aspect, this gas is re-injected using a nozzle 233 or eductor situated inside the separation system 222. A gas stream 234, from which the heavy hydrocarbons-rich liquid has been separated, exits the separation system 222 in an in-line orientation with the pipe 204. The proportion of light hydrocarbons to heavy hydrocarbons is higher in gas stream 234 than in gas stream 206.

Figure 3A:
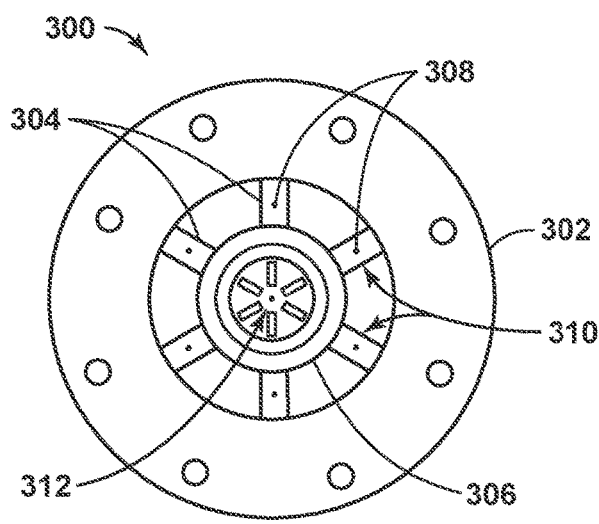
FIG. 3A is a front view of a contacting device according to disclosed aspects.

FIG. 3A is a front view of a contacting device 300. The contacting device 300 may be implemented within a co-current contactor, for example, in the co-current contactor 202 described with respect to the co-current contacting system 200 of FIG. 2. The contacting device 300 can be an axial, in-line co-current contactor located within a pipe. The front view of the contacting device 300 represents an upstream view of the contacting device 300.

The contacting device 300 may include an outer annular support ring 302, a number of spokes 304 extending from the annular support ring 302, and a gas entry cone 306. The annular support ring 302 may secure the contacting device 300 in-line within the pipe. In addition, the spokes 304 may provide support for the gas entry cone 306.

The annular support ring 302 may be designed as a flanged connection, or as a removable or fixed sleeve inside the pipe. In addition, the annular support ring 302 may include a liquid feed system and a hollow channel described further with respect to FIGS. 3C and 3D. A liquid stream may be fed to the contacting device 300 via the hollow channel in the annular support ring 302. The hollow channel may allow equal distribution of the liquid stream along the perimeter of the contacting device 300.

Small liquid channels within the annular support ring 302 may provide a flow path for the liquid stream to flow through liquid injection orifices 308 within the spokes 304. The liquid injection orifices 308 may be located on or near the leading edge of each spoke 304. Placement of the liquid injection orifices 308 on the spokes 304 may allow the liquid stream to be uniformly distributed in a gas stream that is directed between the spokes 304. Specifically, the liquid stream may be contacted by the gas stream flowing through the gaps between the spokes 304, and can be sheared into small droplets and entrained in the gas phase.

A portion of the feed gas stream flows between the spokes to the mass transfer section while the remainder of the gas stream flows into the gas entry cone 306 through a gas inlet 312. The gas entry cone 306 may block a cross-sectional portion of the pipe. The spokes 304 include gas exit slots 310 that allow the gas stream to be flowed out of the gas entry cone 306. This may increase the velocity of the gas stream as it flows through the pipe. The gas entry cone 306 may direct a predetermined amount of the gas stream to the gas exit slots 310 on the spokes 304.

Some of the liquid stream injected through the spokes 304 may be deposited on the surface of the spokes 304 as a liquid film. As the gas stream flows through the gas entry cone 306 and is directed out of the gas exit slots 310 on the spokes 304, the gas stream may sweep, or blow, much of the liquid film off the spokes 304. This may enhance the dispersion of the liquid stream into the gas phase. Further, the obstruction to the flow of the gas stream and the shearing effect created by the exit of the gas through the gas exit slots may provide a zone with an increased turbulent dissipation rate. The may result in the generation of smaller droplets that enhance the mass transfer rate of the liquid stream and the gas stream.

The dimensions of various components of the contacting device 300 may be varied such that the gas stream flows at a high velocity. This may be accomplished via either a sudden reduction in the diameter of the annular support ring 302 or a gradual reduction in the diameter of the annular support ring 302. The outer wall of the contacting device 300 may be slightly converging in shape, terminating at the point where the gas stream and the liquid stream are discharged into the downstream pipe. This can allow for the shearing and re-entrainment of any liquid film that is removed from the contacting device 300. Further, a radial inward ring, grooved surface, or other suitable equipment may be included on the outer diameter of the contacting device 300 near the point where the gas stream and the liquid stream are discharged into the downstream pipe. This may enhance the degree of liquid entrainment within the gas phase.

The downstream end of the contacting device 300 may discharge into a section of pipe (not shown). The section of pipe can be a straight section of pipe, or a concentric expansion section of pipe. The gas entry cone 306 may terminate with a blunt ended cone or a tapered ended cone. In other embodiments, the gas entry cone 306 can terminate with a ridged cone, which can include multiple concentric ridges along the cone that provide multiple locations for droplet generation. In addition, any number of gas exit slots 310 may be provided on the cone itself to allow for the removal of the liquid film from the contacting device 300.

Figure 3B:
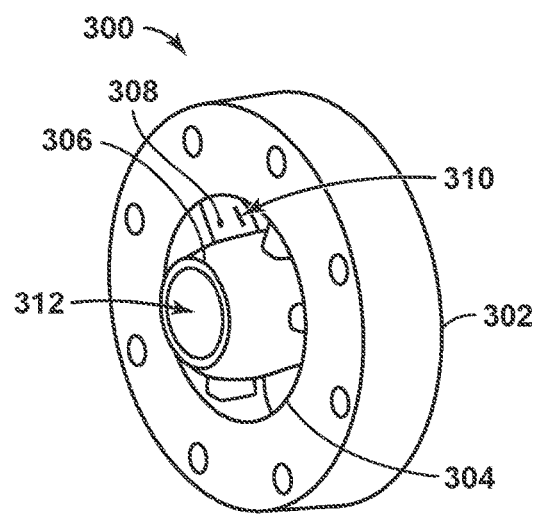
FIG. 3B is a side perspective view of the contacting device of FIG. 3A.

FIG. 3B is a side perspective view of the contacting device 300. Like numbered items are as described with respect to FIG. 3A. As shown in FIG. 3B, the upstream portion of the gas entry cone 306 may extend further into the pipe than the annular support ring 302 and the spokes 304 in the upstream direction. The downstream portion of the gas entry cone 306 can also extend further into the pipe than the annular support ring 302 and the spokes 304 in the downstream direction. The length of the gas entry cone 306 in the downstream direction depends on the type of cone at the end of the gas entry cone 306, as described further with respect to FIGS. 3C and 3D.

Figure 3C:
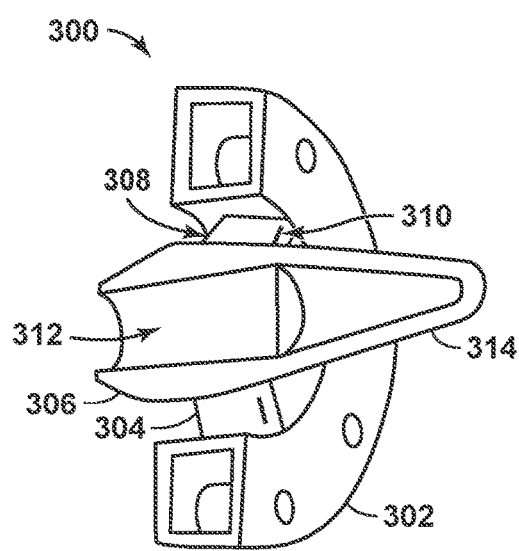
FIG. 3C is a cross-sectional side perspective view of the contacting device of FIG. 3A according to disclosed aspects.

FIG. 3C is a cross-sectional side perspective view of the contacting device 300 according to a disclosed aspect. Like numbered items are as described with respect to FIGS. 3A and 3B. According to FIG. 3C, the gas entry cone 306 of the contacting device 300 terminates with a tapered ended cone 314. Terminating the gas entry cone 306 with a tapered ended cone 314 may reduce the overall pressure drop in the pipe caused by the contacting device 300.

Figure 3D:
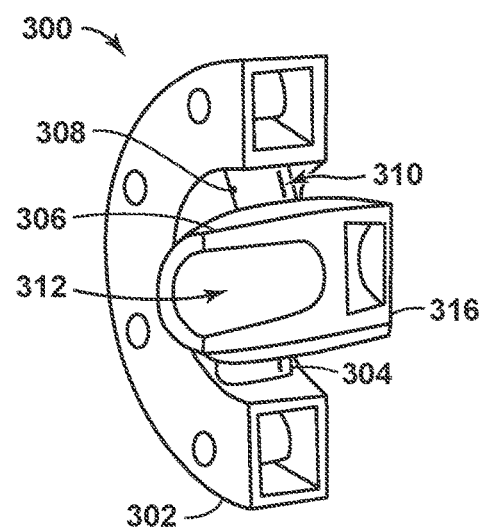
FIG. 3D is a another cross-sectional side perspective view of the contacting device according to disclosed aspects.

FIG. 3D is a cross-sectional side perspective view of the contacting device 300 according to another disclosed aspect. Like numbered items are as described with respect to FIGS. 3A-3C. According to FIG. 3D, the gas entry cone 306 of the contacting device 300 terminates with a blunt ended cone 316. Terminating the gas entry cone 306 with a blunt ended cone 316 may encourage droplet formation in the center of the pipe.

Figure 4:
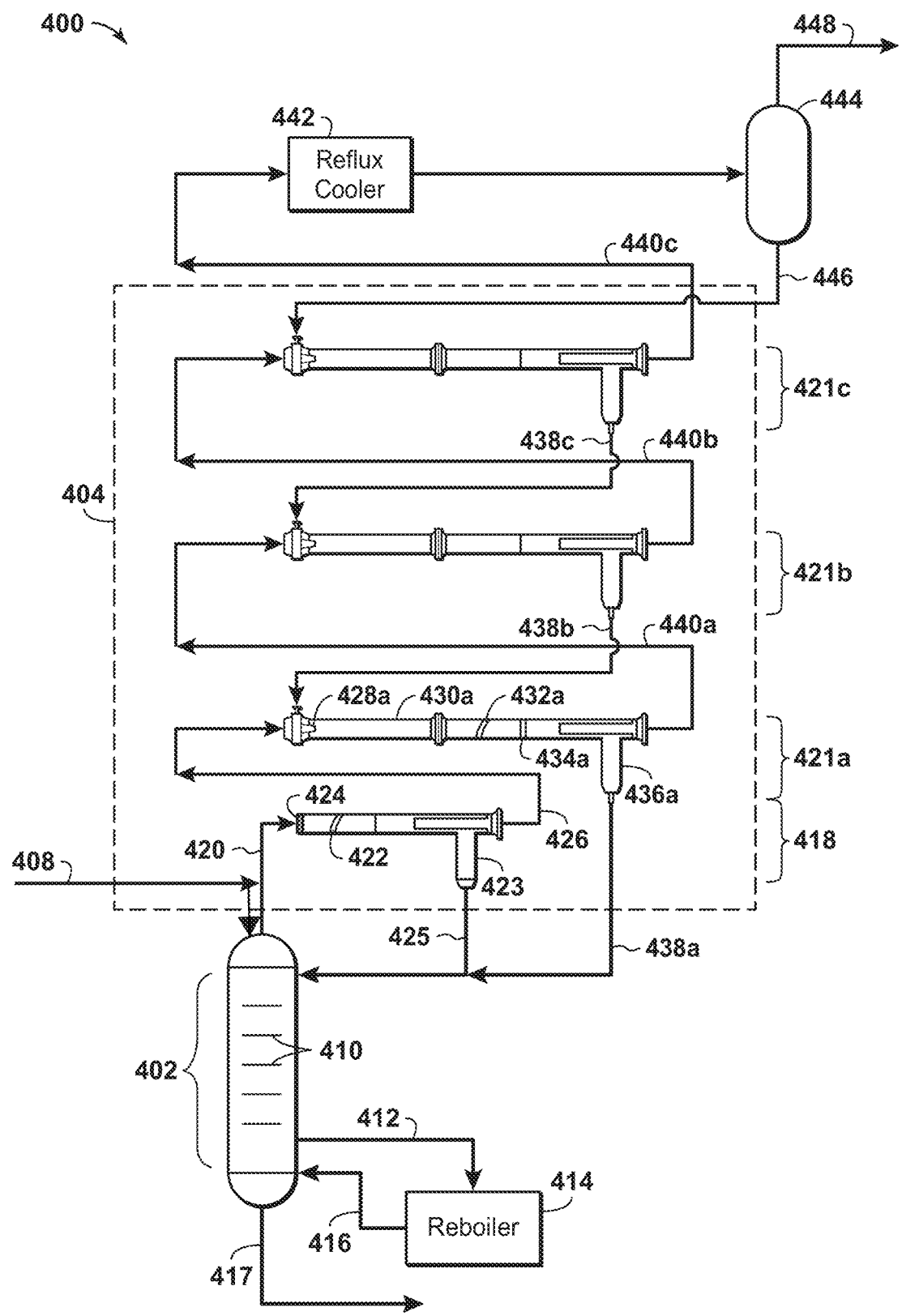
FIG. 4 is a generalized schematic diagram of a gas fractionation system according to aspects disclosed herein.

FIG. 4 depicts a gas fractionation system 400 according to disclosed aspects, which may be used with natural gas liquefaction process. The gas fractionation system 400 includes a bottom section, also known as a scrub stripper column 402, and a top section or rectification section 404, which according to disclosed aspects comprises a plurality of co-current contacting systems. The scrub stripper column 402 may be a stand-alone column, and performs an equivalent function to the stripping section 102 of scrub column 100 depicted in FIG. 1. As can be seen in FIG. 4, the feed gas stream 408, which typically is a two-phase stream, enters the gas fractionation system 400 at high pressure and at a position adjacent both the scrub stripper column 402 and the rectification section 404. A predominantly vapor phase and a predominantly liquid phase in the feed gas stream 408 separate from each other, with the predominantly vapor phase moving upward into the rectification section 404 and the predominantly liquid phase moving downward into the scrub stripper column 402. The scrub stripper column 402 uses trays 410 to separate and direct liquid downward. Trays 410 are typically used instead of packing because of anticipated high liquid flux, which is defined as a volumetric flow per unit area.

A liquid stream 412 is extracted near the bottom of the scrub stripper column 402 and is re-heated in a reboiler 414. The reheated stream 416 is returned to the scrub stripper column 402, where vapors in the reheated stream may rise through the scrub stripper column and enter the rectification section 404. Liquids in the reheated stream 416 combine with other liquids at the bottom of the scrub stripper column 402. A scrub stripper column liquid bottoms stream 417 may be taken from the bottom of the scrub stripper column 402.

The vapor phase of the feed gas stream 408 is combined with the vapor rising from the from the scrub stripper column 402. The combined vapor stream 420 enters the rectification section 404, which in an aspect includes a separation system 418 and one or more scrubbing stages, with each scrubbing stage including an in-line co-current contacting system 421a, 421b, 421c similar to the in-line co-current contacting system 200 described in FIG. 2. In a preferred aspect the separation system 418 includes a cyclonic separator, and in a more preferred embodiment includes an in-line cyclonic separator 422 and a collector 423 similar to the cyclonic separator 223 and collector 224 used in separation system 222 of FIG. 2. The in-line cyclonic separator 422 serves as a flash zone to cause some of the liquids entrained in the combined vapor stream 420 to be separated therefrom. If the gas fractionation system 400 is used where no fouling is expected due to the content of the feed stream, an agglomerator 424 may be placed in front of the in-line cyclonic separator 422 to increase the size of the liquid droplets entering the in-line cyclonic separator. Agglomerator 424 may improve the liquid separation performance of the in-line cyclonic separator 422. The liquid collected from the collector 423 is fed through a flash reflux line 425 to a top region of the scrub stripper column 402 for further separation therein.

The flash zone vapor stream 426 exiting the in-line cyclonic separator 422 is fed to the first co-current contacting system 421a, which includes a droplet generator 428a, a mass transfer section 430a, a cyclonic separator 432a with an optional agglomerator 434a, and a collector 436a. Liquid 438b collected from a subsequent or downstream in-line co-current contacting system (such as in-line co-current contacting system 421b) is injected into the droplet generator 428a and mixed and combined in the mass transfer section, where heavy hydrocarbons in the flash zone vapor stream are transferred to the sprayed liquid, and light hydrocarbons in the liquid stream are transferred to the flash zone vapor stream. The liquid and vapor in the mass transfer section 430a are separated from each other using the cyclonic separator 432a and optional agglomerator 434a, with the liquid being collected in the collector 436a and sent through a liquid collection line 438a to be combined with the flash reflux line 425. The gas stream 440a with heavy hydrocarbons removed therefrom is sent as an input to the second co-current contacting system 421b. The second co-current contacting system 421b is constructed similar to first co-current contacting system 421a and functions in a similar manner, with liquid 438c collected from a subsequent or downstream in-line co-current contacting system (such as in-line co-current contacting system 421c) being mixed with the gas stream 440a. The gas stream 440b with heavy hydrocarbons removed in the second co-current contacting system 421b is sent as an input to the third co-current contacting system 421c. The third co-current contacting system 421c is constructed similar to first and second co-current contacting systems 421a, 421b and functions in a similar manner. The gas stream 440c with heavy hydrocarbons removed therefrom is sent to a reflux cooler 442, which condenses heavy hydrocarbons remaining in the gas stream, which are in turn separated in liquid form from the gas stream in a reflux drum 444. The reflux liquid stream 446 is used as the liquid input to the third co-current contacting system 421c, and the gas stream 448 exiting the reflux drum is sent for further processing, which may include liquefaction.

The gas fractionation system 400 may include any number of co-current contacting systems as desired or required. Further, any number of additional components can be included within the gas fractionation system 400, depending on the details of the specific implementation. Further, the gas fractionation system 400 may include any suitable types of heaters, chillers, condensers, liquid pumps, gas compressors, blowers, bypass lines, other types of separation and/or fractionation equipment, valves, switches, controllers, and pressure-measuring devices, temperature-measuring devices, level-measuring devices, or flow-measuring devices, among others.

Figure 5:
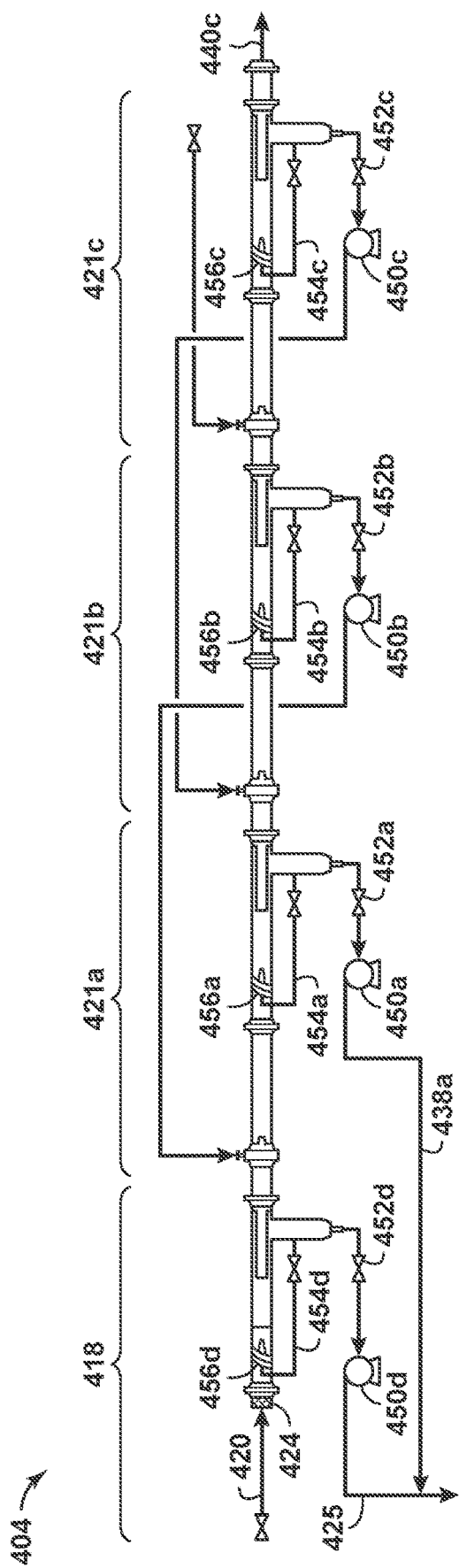
FIG. 5 is a process flow diagram of a portion of a gas fractionation system including a number of co-current contacting systems, according to disclosed aspects.

FIG. 5 is a schematic diagram of another arrangement of the rectification section 404 of the gas fractionation system 400. Shown are the separation system 418 and three scrubbing stages which comprise the first, second, and third in-line co-current contacting systems 421a, 421b, 421c. For each of the separation system and the first through third in-line co-current contacting systems, FIG. 5 also shows the pumps 450a, 450b, 450c, 450d, valves 452a, 452b, 452c, 452d, gas purge lines 454a, 454b, 454c, 454d, and nozzles 456a, 456b, 456c, 456d that were described with respect to FIG. 2. FIG. 5 shows more clearly that the disclosed aspects are operated with an overall countercurrent flow of the liquid from previous scrubbing stages, with co-current contacting in individual scrub stages.

Figures 6A, 6B:
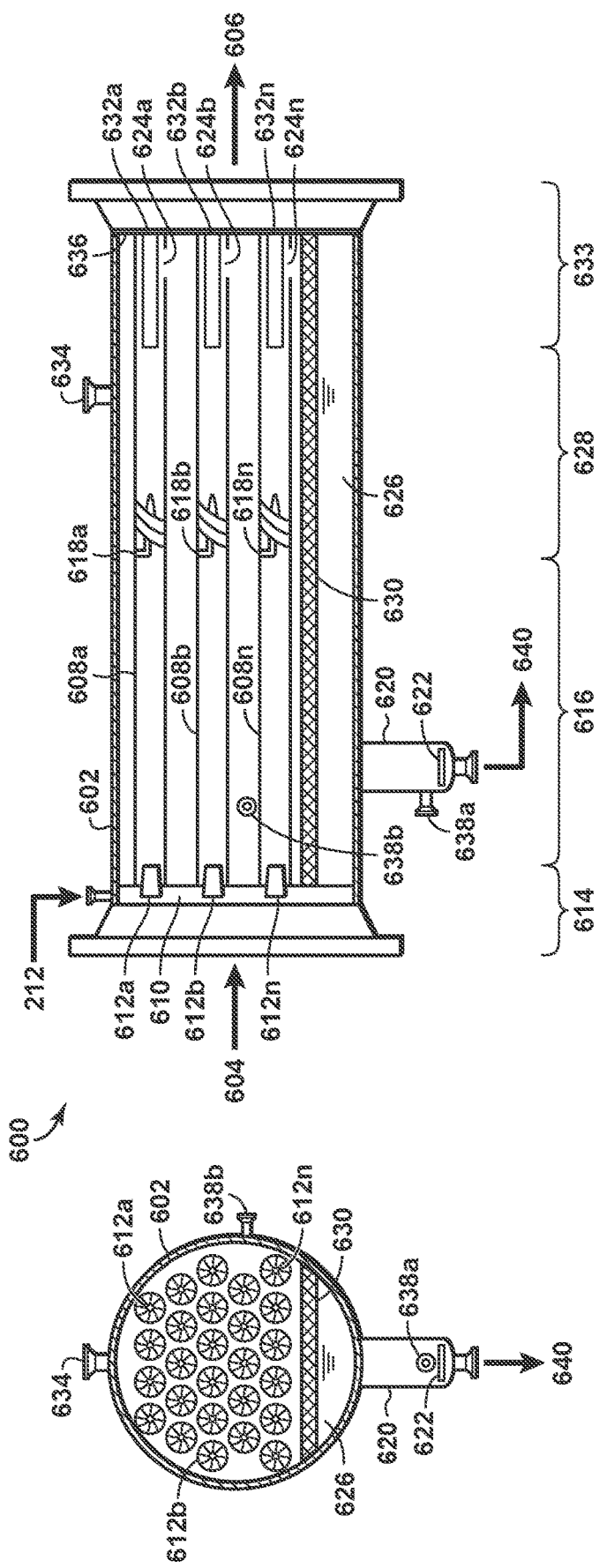
FIGS. 6A and 6B are side and end views, respectively, of a bundle of parallel co-current contacting systems according to disclosed aspects.

FIG. 6A is a side view of a single stage multiple co-current contactor configuration 600 that may be used as part or all of a rectification section in a gas fractionation system as previously disclosed. The single stage multiple co-current contactor configuration 600 is generally contained within a vessel 602 which may form a unitary (single and/or common) pressure boundary for the compact contacting occurring therein. The vessel 602 may be configured to withstand in excess of (may have a pressure vessel rating of) about 500 psia (about 34 bar) of pressure, e.g., from about 600 psia (about 41 bar) to about 3,000 psia (about 207 bar), from about 800 psia (about 48 bar) to about 3,000 psia (about 207 bar), about 600 psia (about 41 bar) to about 2,000 psia (about 138 bar), from about 800 psia (about 48 bar) to about 2,000 psia (about 138 bar) from about 600 psia (about 41 bar) to about 1,000 psia (about 70 bar), from about 800 psia (about 48 bar) to about 1,000 psia (about 70 bar), from about 1,000 psia (about 70 bar) to about 3,000 psia (about 207 bar), from about 1,000 psia (about 70 bar) to about 2,000 psia (about 138 bar), from about 2,000 psia (about 138 bar) to about 3,000 psia (about 207 bar), or any range there between. The differential pressure across the length of the vessel 602, e.g., between the gas stream 604 and natural gas stream 606, may be about 200 psia (about 14 bar) to about 700 psia (about 48 bar), about 300 psia (about 21 bar) to about 600 psia (about 41 bar), about 400 psia (about 28 bar) to about 500 psia (about 34 bar), about 200 psia (about 14 bar) to about 600 psia (about 41 bar), about 300 psia (about 21 bar) to about 600 psia (about 41 bar), about 400 psia (about 28 bar) to about 600 psia (about 41 bar), about 500 psia (about 34 bar) to about 600 psia (about 41 bar), about 200 psia (about 14 bar) to about 500 psia (about 34 bar), about 300 psia (about 21 bar) to about 500 psia (about 34 bar), about 200 psia (about 14 bar) to about 400 psia (about 28 bar), about 300 psia (about 21 bar) to about 400 psia (about 28 bar), about 200 psia (about 14 bar) to about 300 psia (about 21 bar), or any range therebetween. The vessel 602 generally contains a single stage bundle of substantially parallel separation units or compact contactors comprising contacting units 608a-608n, also referred to herein as separation units. Those of skill in the art will understand that the number of contacting units 608a-608n in the bundle of compact contactors may be optionally selected based on the desired design characteristics, including desired flow rate, separation unit diameter, etc., and could number from anywhere between one to 300 or more units. The use of the letter nomenclature (i.e., 'a', 'b', 'n', etc.) in conjunction with the numerical reference characters is for ease of reference only and is not limiting. For example, those of skill in the art will understand that an illustrated set of contacting units 608a-608n may, in various embodiments, comprise two, four, five, twenty, or several hundred contacting units. The vessel 602 comprises an inlet manifold 610 having droplet generators 612a-612n in the inlet section 614 of the single stage multiple co-current contactor configuration 600. The inlet section 614 is configured to receive the natural gas stream 604 in a common inlet plenum through which the natural gas stream 604 may be distributed substantially equally across the contacting units 608a-608n. While a gas stream 604, gas stream 606, etc. are discussed herein, those of skill in the art will appreciate that generally the same principles may be applied to any fluid stream, including with respect to liquid-liquid contacting. Consequently, use of the phrases "gas stream," "gas inlet," "gas outlet," etc. are to be understood as non-limiting and may optionally be replaced with "fluid stream," "fluid inlet," "fluid outlet," and so forth in various embodiments within the scope of this disclosure. Use of the phrases "gas stream," "gas inlet," "gas outlet," etc. are for the sake of convenience only. The contacting units 608a-608n may be of a suitable size depending on the design requirements. For example, the contacting units 608a-608n may have an individual diameter from about 2 inches (in) (about 5 centimeters (cm)) to about 24 in (about 61 cm), about 3 in (about 7.6 cm) to about 20 in (about 50 cm), about 4 in (about 10.1 cm) to about 18 in (about 45 cm), about 6 in (about 15.3 cm) to about 12 in (about 30 cm), about 6 in (about 15.3 cm) to about 18 in (about 45 cm), about 12 in (about 30 cm) to about 18 in (about 45 cm), about 18 in (about 45 cm) to about 24 in (about 61 cm), or any range there between. The inlet manifold 610 is configured to receive a liquid stream 212 and pass the liquid stream 212 to the droplet generators 612a-612n, where the liquid stream 212 may be atomized. Droplet generators 612a-612n are similar to the droplet generator 208 or contacting device 300 as previously described. The droplet generators 612a-612n may serve to entrain the atomized liquid stream in the gas stream 604, and the mixed stream of atomized solvent and natural gas may be passed to the mass transfer section 616 where absorption occurs. Each contacting unit 608a-608n has a recycle gas inlet 618a-618n supplied by recycle gas collected and returned, e.g., from a common boot 620. The boot 620 may be optionally included in low liquid rate applications to improve liquid rate flow control. As depicted, the boot 620 may have an internal vortex breaker 622 or other appropriate internals. For ease of viewing, the recycle gas supply lines for each of the recycle gas inlets 618a-618n are not depicted, but may be similar to gas purge line 232 as previously described. As will be understood by those of skill in the art, the recycle gas inlets 618a-618n are optional, and recycle gas may additionally or alternatively be sent downstream in other aspects. Liquid exiting the contacting units 608a-608n via liquid outlets 624a-624n may drain into a common liquid degassing section or common liquid collection plenum 626. The plenum 626 may provide sufficient residence time for desired degassing, may reduce liquid surges coming with the natural gas stream 604, and may provide a liquid seal to a cyclonic separation occurring in a contacting section 628 of each contacting unit 608a-608n. The residence time provided by the plenum 626 can vary from 5 seconds to 5 minutes, depending on the operation of the process, or from 30 seconds to 1 minute in various aspects. The vessel 602 contains a mist eliminator 630, e.g., a wire mesh, vane pack plates, baffles, or other internal devices to reduce liquid droplet carry over from degassing gas, leaving the liquid in the plenum 626. The mist eliminator 630 may also serve as a momentum breaker for the liquid exiting each contacting unit 608a-608n to minimize aeration of the liquid. In aspects installed in offshore facilities or floating facilities or otherwise subject to motion, the mist eliminator 630 may mitigate wave motion effects in the bottom portion of the vessel 602. Each contacting unit 608a-608n has a treated gas outlet 632a-632n and a liquid outlet 624a-624n in a separation section 633. The vessel 602 has a vent 634 for expelling degassing gas, e.g., gas degassed from liquid collected in the plenum 626 that may be fed upstream or downstream of the multiple co-current contacting unit, depending on the process configuration. The treated gas outlets 632a-632n couple to an outlet manifold 636. The vessel 602 also contains level control ports 638a and 638b for coupling a level control system (not depicted) and controlling the amount of liquid 640 exiting the boot 620. Liquid 640 exiting the boot 620 may be sent to a rectification section of a fractionation system, as previously described.

FIG. 6B is a cross-sectional end view of the single stage multiple co-current contactor configuration 600 of FIG. 6A taken at the inlet manifold 610. FIG. 6B shows an example arrangement of the contacting units in the vessel 602, although for the sake of simplicity only the droplet generators 612a-612n associated with the contacting units are shown. Other acceptable arrangements will be readily apparent to those of skill in the art. FIG. 6B also shows a location of the mist eliminator 630, the plenum 626, the vent 634, the boot 620, the level control ports 638a and 638b, and the liquid stream 640.

FIGS. 6A and 6B depict a single stage multiple co-current contactor configuration. Additional stages may also be included in a multiple co-current contactor, as disclosed in co-owned U.S. Patent Application Publication No. US2016/0199774 titled "Separating Impurities from a Fluid Stream Using Multiple Co-current Contactors", the disclosure of which is incorporated herein by reference in its entirety. Additionally, any of the in-line co-current contacting systems 421a, 421b, 421c of the gas fractionation system depicted in FIGS. 4 and 5 may be replaced by a single stage or multiple stage multiple co-current contactor as described herein.

Figure 7:
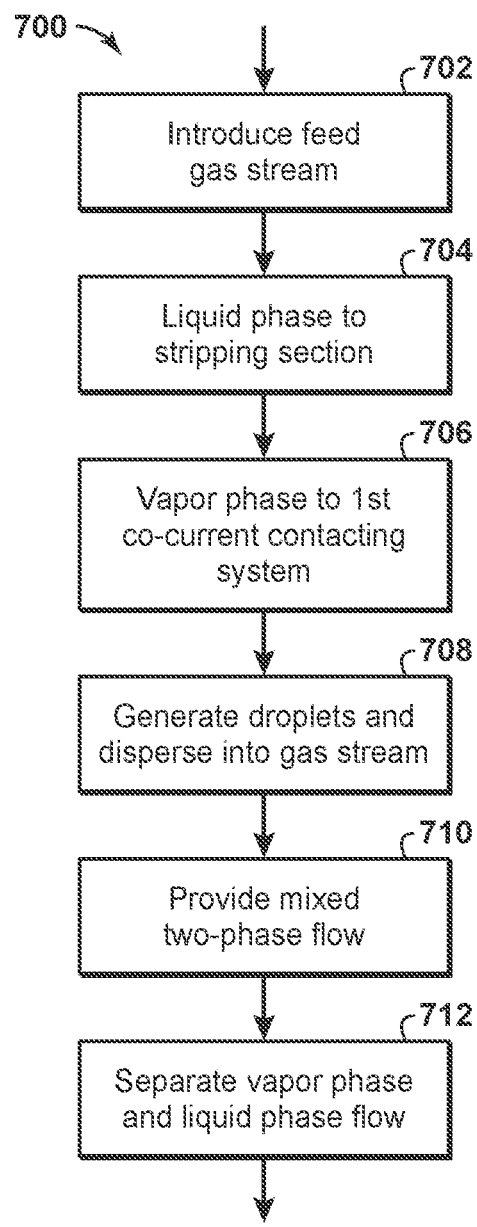
FIG. 7 is a process flow diagram of a method for gas fractionation using co-current contacting systems according to disclosed aspects.

FIG. 7 is a method 700 of removing heavy hydrocarbons in a gas stream according to aspects of the disclosure. At block 702 a feed gas stream is introduced into a feed gas inlet. At block 704 a predominantly liquid phase of the feed gas stream is received into a stripping section. At block 706 a predominantly vapor phase of the feed gas stream is received into a first co-current contacting system located in-line within a pipe with a second co-current contacting system. Each of the first and second co-current contacting systems comprise a co-current contactor including a droplet generator and a mass transfer section, and a separation system. At block 708, using each droplet generator, droplets from a liquid are generated and dispersed into a gas stream. At block 710, in each mass transfer section a mixed, two-phase flow is provided having a vapor phase and a liquid phase. At block 712, in each separation system the vapor phase from the liquid phase are separated. The vapor phase of the co-current contactor in the first co-current contacting system comprises the gas stream for the co-current contactor in the second co-current contacting system. The liquid phase of the co-current contactor in the second co-current contacting system comprises the liquid from which droplets are generated in the co-current contactor of the first co-current contacting system.

Figure 8:
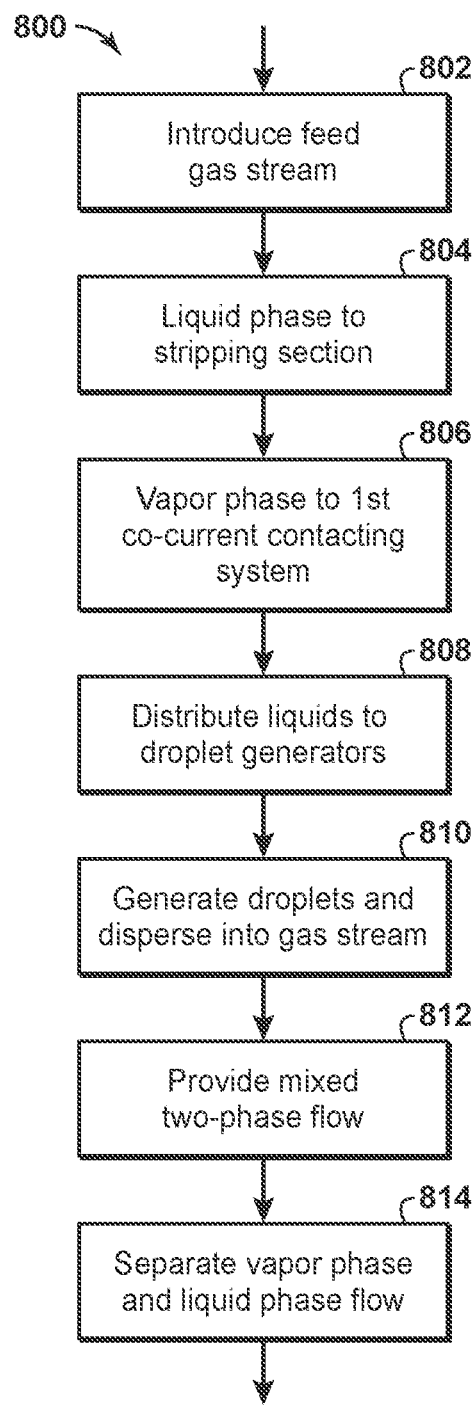
FIG. 8 is a process flow diagram of a method for gas fractionation using co-current contacting systems according to disclosed aspects.

FIG. 8 is a method 800 of a method of removing heavy hydrocarbons in a gas stream. At block 802 a feed gas stream is introduced into a feed gas inlet. At block 804 a predominantly liquid phase of the feed gas stream is received into a stripping section. At block 806 a predominantly vapor phase of the feed gas stream is received into a first co-current contacting system located in-line within a pipe with a second co-current contacting system. At least one of the first and second co-current contacting systems comprises a compact contacting bundle disposed within a vessel that forms a unitary pressure boundary. The compact contacting bundle includes a plurality of substantially parallel contacting units. Each of the plurality of contacting units has a droplet generator and a mass transfer section, and a separation system. At block 808 the liquid is distributed to each droplet generator of the plurality of contacting units. At block 810, using each droplet generator, droplets are generated from a liquid and dispersing the droplets into a gas stream. At block 812, in each mass transfer section, a mixed, two-phase flow is provided having a vapor phase and a liquid phase. At block 814, in each separation system, the vapor phase is separated from the liquid phase. The vapor phase of the first co-current contacting system comprises the gas stream for the second co-current contacting system, and the liquid phase of the second co-current contacting system comprises the liquid from which droplets are generated in the first co-current contacting system.

The disclosed aspects may be varied in many ways. For example, the compact co-current contacting systems have been shown in the Figures as being connected to each other in series, but for additional turndown flexibility one or more of the compact co-current contacting systems may be connected to each other in parallel. The separation systems disclosed herein may also be varied. Instead of the disclosed single cyclonic separator, in-line demisting cyclones may be used. Additional in-line demisting cyclones may be installed after the last scrubbing stage if further liquid separation is desired or required. Other known mist-eliminating devices may replace the cyclonic separator. The methods, processes, and/or functions described herein can be implemented and/or controlled by a computer system appropriately programmed.

Moreover, it is contemplated that features from various examples described herein can be combined together, including some but not necessarily all the features provided for given examples. Furthermore, the features of any particular example are not necessarily required to implement the present technological advancement.

The disclosed aspects replace the large diameter packed rectification section of known LNG scrub columns. An advantage of the disclosed aspects is that the disclosed aspects may be used with many different LNG processes with scrub column schemes. Another advantage is that the compact co-current contacting systems can be horizontally oriented, vertically oriented, or in a mixed orientation as required or desired to best meet the limitations of an existing plot or module space.

Other advantages of the disclosed aspects may be seen through reduced capital costs and potentially enhanced processing capacity in space-limited retrofit and de-bottlenecking opportunities. Due to the operating pressure of conventional LNG Scrub columns (~60 bar, 850 psia) and the low operating processing temperatures of the system (−20° C.), the column must be constructed of very expensive stainless steel with a very thick wall. For example, a scrub column where the top/rectification section of a conventional packed stainless steel scrub column has a diameter of 4.2 m, approximately 12.6 m height (including a flash zone) and 105 mm wall thickness, can be replaced with the disclosed scrubbing system enclosed in a pipe having a 24 inch (60.96 cm) diameter. This may result in an approximately 75% reduction in capital expenditures, not to mention additional savings in transportation, civil and structural supports, when compared to known scrub columns.

Additionally, the rectification function may be used in many applications, such as: new LNG facilities requiring a scrub column; LNG production on floating facilities, as the disclosed aspects are not susceptible to tower motion inefficiencies; any fractionation application (stripping and/or rectification section) having a low liquid flow rate; a brownfield LNG Scrub Column where the existing rectification section is a bottleneck to the capacity of the column; and LNG production in populated areas where height is to be minimized for visual pollution reasons.

Aspects of the disclosure may include any combinations of the methods and systems shown in the following numbered paragraphs. This is not to be considered a complete listing of all possible aspects, as any number of variations can be envisioned from the description above.

A1. A fractionation system for removing heavy hydrocarbons in a gas stream, comprising:
a feed gas inlet through which a feed gas stream is introduced;
a stripping section configured to receive a predominantly liquid phase of the feed gas stream; and
first and second co-current contacting systems located in-line within a pipe, the first co-current contacting system configured to receive a predominantly vapor phase of the feed gas stream, each of the first and second co-current contacting systems comprising:
a co-current contactor including a droplet generator and a mass transfer section, the droplet generator configured to generate droplets from a liquid and to disperse the droplets into a gas stream, and the mass transfer section configured to provide a mixed, two-phase flow having a vapor phase and a liquid phase; and
a separation system configured to separate the vapor phase from the liquid phase;
wherein the vapor phase of the co-current contactor in the first co-current contacting system comprises the gas stream for the co-current contactor in the second co-current contacting system, and wherein the liquid phase of the co-current contactor in the second co-current contacting system comprises the liquid from which droplets are generated in the co-current contactor of the first co-current contacting system.

A2. The fractionation system of paragraph A1, wherein the droplet generator in the co-current contactor in at least one of the first and second co-current contacting systems comprises:
an annular support ring securing the droplet generator in-line within the pipe;
a plurality of spokes extending from the annular support ring, the annular support ring having a plurality of liquid channels configured to allow a liquid stream to flow through the plurality of spokes and out of injection orifices disposed on the plurality of spokes; and
a gas entry cone supported by the plurality of spokes and configured to allow
a first portion of a gas stream to flow through a hollow section of the gas entry cone and through gas exit slots included in the plurality of spokes, and
a second portion of the gas stream to flow around the gas entry cone and between the plurality of spokes, wherein the second portion of the gas stream is separate from the first portion of the gas stream.

A3. The fractionation system of paragraph A2, wherein a downstream portion of the gas entry cone comprises a blunt ended cone.

A4. The fractionation system of paragraph A2, wherein a downstream portion of the gas entry cone comprises a tapered ended cone.

A5. The fractionation system of paragraph A1 or paragraph A2, further comprising an in-line flash separator arranged to receive the predominantly vapor phase of the feed gas stream prior to said predominantly vapor phase being sent through the first co-current contacting system, the in-line flash separator configured to separate liquids from the predominantly vapor phase.

A6. The fractionation system of paragraph A5, further comprising a flash reflux line connected to the in-line flash separator and to the stripping section, the flash reflux line configured to convey liquids separated from the predominantly vapor phase in the in-line flash separator to the stripping section.

A7. The fractionation system of paragraph A5, wherein the in-line flash separator comprises a cyclonic separator.

A8. The fractionation system of paragraph A5, further comprising an agglomerator situated at an input of the in-line flash separator.

A9. The fractionation system of any of paragraphs A1-A8, wherein the separation system of at least one of the first and second co-current contacting systems comprises a cyclonic separator.

A10. The fractionation system of any of paragraphs A1-A9, further comprising:
a plurality of co-current contacting systems connected in series, said plurality of co-current contacting systems including the first and second co-current contacting systems and a last co-current contacting system; and
a reflux drum configured to receive a vapor phase from the last co-current contacting system and separate a reflux liquid from said vapor phase;
wherein the last co-current contacting system comprises:
a co-current contactor including a droplet generator and a mass transfer section, the droplet generator configured to generate droplets from the reflux liquid and to disperse the droplets into a gas stream received from a previous co-current contacting system, and the mass transfer section configured to provide a mixed, two-phase flow having a vapor phase and a liquid phase; and
a separation system configured to separate the vapor phase from the liquid phase, wherein the vapor phase is sent to the reflux drum and the liquid phase comprises the liquid from which droplets are generated in a co-current contactor of a previous co-current contacting system.

A11. The fractionation system of paragraph A10, further comprising a reflux cooler situated between the last co-current contacting system and the reflux drum, the reflux cooler configured to cool the vapor phase of the last co-current contacting system prior to being sent to the reflux drum.

A12. The fractionation system of any of paragraphs A1-A11, wherein the feed gas stream comprises a natural gas stream, and wherein the heavy hydrocarbons comprise at least one of propane, butane, hexane, and heptane.

A13. A method of removing heavy hydrocarbons in a gas stream, comprising:
introducing a feed gas stream into a feed gas inlet;
receiving a predominantly liquid phase of the feed gas stream into a stripping section;
receiving a predominantly vapor phase of the feed gas stream into a first co-current contacting system located in-line within a pipe with a second co-current contacting system, each of the first and second co-current contacting systems comprising a co-current contactor including a droplet generator and a mass transfer section, and a separation system;
using each droplet generator, generating droplets from a liquid and dispersing the droplets into a gas stream;
in each mass transfer section, providing a mixed, two-phase flow having a vapor phase and a liquid phase; and
in each separation system, separating the vapor phase from the liquid phase;
wherein the vapor phase of the co-current contactor in the first co-current contacting system comprises the gas stream for the co-current contactor in the second co-current contacting system, and wherein the liquid phase of the co-current contactor in the second co-current contacting system comprises the liquid from which droplets are generated in the co-current contactor of the first co-current contacting system.

A14. The method of paragraph A13, wherein the droplet generator in the co-current contactor in at least one of the first and second co-current contacting systems includes an annular support ring securing the droplet generator in-line within the pipe, a plurality of spokes extending from the annular support ring, and a gas entry cone supported by the plurality of spokes, the method further comprising:
flowing a liquid stream through liquid channels disposed in the annular support stream, through the plurality of spokes, and out of injection orifices disposed on the plurality of spokes;
flowing a first portion of a gas stream through a hollow section of the gas entry cone and through gas exit slots included in the plurality of spokes, and
flowing a second portion of the gas stream around the gas entry cone and between the plurality of spokes, wherein the second portion of the gas stream is separate from the first portion of the gas stream.

A15. The method of paragraph A13, further comprising:
receiving the predominantly vapor phase of the feed gas stream in an in-line flash separator prior to sending the predominantly vapor phase through the first co-current contacting system; and
separating liquids from the predominantly vapor phase in the in-line flash separator.

A16. The method of paragraph A15, further comprising:
conveying liquids separated from the predominantly vapor phase in the in-line flash separator to the stripping section via a flash reflux line.

A17. The method of paragraph A15, further comprising:
feeding the predominantly vapor phase of the feed gas stream into an agglomerator prior to the predominantly vapor phase of the feed gas stream being received by the in-line flash separator.

A18. The method of paragraph A13 or paragraph A14, further comprising:
arranging a plurality of co-current contacting systems in series, the plurality of co-current contacting systems including the first and second co-current contacting systems and a last co-current contacting system that has a co-current contactor and a separation system, wherein the co-current contactor of the last co-current contacting system has a droplet generator and a mass transfer section;
in a reflux drum, separating a vapor phase of the last co-current contacting system from a reflux liquid;
generating droplets from the reflux liquid in the droplet generator of the co-current contactor of the last co-current contacting system;
dispersing said droplets into a gas stream received from a previous co-current contacting system;
in the mass transfer section of the co-current contactor of the last co-current contacting system, providing a mixed, two-phase flow having a vapor phase and a liquid phase;
in the separation system of the co-current contactor of the last co-current contacting system, separating the vapor phase from the liquid phase of the mixed, two-phase flow;
sending the vapor phase of the mixed, two-phase flow to the reflux drum; and
using the liquid phase of the mixed, two-phase flow to generate droplets in a co-current contactor of a previous co-current contacting system.

A19. The method of paragraph A18, further comprising:
cooling the vapor phase of the mixed, two-phase flow generated by the separation system of the co-current contactor of the last co-current contacting system prior to sending said vapor phase to the reflux drum.

A20. A fractionation system for removing heavy hydrocarbons in a gas stream, comprising:
a feed gas inlet through which a feed gas stream is introduced, the feed gas comprising a natural gas stream;

a stripping section configured to receive a predominantly liquid phase of the feed gas stream;

first and second co-current contacting systems located in-line within a pipe, the first co-current contacting system configured to receive a predominantly vapor phase of the feed gas stream, each of the first and second co-current contacting systems comprising:
- a co-current contactor including a droplet generator and a mass transfer section, the droplet generator configured to generate droplets from a liquid and to disperse the droplets into a gas stream, and the mass transfer section configured to provide a mixed, two-phase flow having a vapor phase and a liquid phase, wherein the droplet generator includes
    - an annular support ring securing the droplet generator in-line within the pipe;
    - a plurality of spokes extending from the annular support ring, the annular support ring having a plurality of liquid channels configured to allow a liquid stream to flow through the plurality of spokes and out of injection orifices disposed on the plurality of spokes; and
    - a gas entry cone supported by the plurality of spokes and configured to allow:
    - a first portion of a gas stream to flow through a hollow section of the gas entry cone and through gas exit slots included in the plurality of spokes, and
    - a second portion of the gas stream to flow around the gas entry cone and between the plurality of spokes, wherein the second portion of the gas stream is separate from the first portion of the gas stream; and
- a separation system configured to separate the vapor phase from the liquid phase;

wherein the vapor phase of the co-current contactor in the first co-current contacting system comprises the gas stream for the co-current contactor in the second co-current contacting system, and wherein the liquid phase of the co-current contactor in the second co-current contacting system comprises the liquid from which droplets are generated in the co-current contactor of the first co-current contacting system;

an in-line flash separator arranged to receive the predominantly vapor phase of the feed gas stream prior to said predominantly vapor phase being sent through the first co-current contacting system, the in-line flash separator configured to separate liquids from the predominantly vapor phase; and a flash reflux line connected to the in-line flash separator and to the stripping section, the flash reflux line configured to convey liquids separated from the predominantly vapor phase in the in-line flash separator to the stripping section.

While the present techniques can be susceptible to various modifications and alternative forms, the examples described above are non-limiting. It should again be understood that the techniques is not intended to be limited to the particular embodiments disclosed herein. Indeed, the present techniques include all alternatives, modifications, and equivalents falling within the true spirit and scope of the appended claims.

What is claimed is:

1. A fractionation system for removing heavy hydrocarbons in a gas stream, comprising:
    a feed gas inlet through which a feed gas stream is introduced, wherein the feed gas stream is subsequently separated into a predominantly liquid phase and a predominantly vapor phase;
    a stripping section configured to receive the predominantly liquid phase of the feed gas stream; and
    first and second co-current contacting systems located in-line within a pipe, the first co-current contacting system configured to receive the predominantly vapor phase of the feed gas stream, each of the first and second co-current contacting systems comprising:
        a co-current contactor including a droplet generator and a mass transfer section, the droplet generator configured to generate droplets from a liquid and to disperse the droplets into a gas stream, and the mass transfer section configured to provide a mixed, two-phase flow having a vapor phase and a liquid phase; and
        a separation system configured to separate the vapor phase from the liquid phase;
    wherein the second co-current contacting system is configured to receive the vapor phase of the co-current contactor in the first co-current contacting system, and wherein the droplet generator of the first co-current contacting system is configured to receive the liquid phase of the co-current contactor in the second co-current contacting system; and further comprising:
    an in-line flash separator arranged to receive the predominantly vapor phase of the feed gas stream prior to said predominantly vapor phase being sent through the first co-current contacting system, the in-line flash separator configured to separate liquids from the predominantly vapor phase.

2. The fractionation system of claim 1, further comprising a flash reflux line connected to the in-line flash separator and to the stripping section, the flash reflux line configured to convey liquids separated from the predominantly vapor phase in the in-line flash separator to the stripping section.

3. The fractionation system of claim 1, wherein the in-line flash separator comprises a cyclonic separator.

4. The fractionation system of claim 1, further comprising an agglomerator situated at an input of the in-line flash separator.

5. The fractionation system of claim 1, wherein the separation system of at least one of the first and second co-current contacting systems comprises a cyclonic separator.

6. The fractionation system of claim 1, wherein the feed gas stream comprises a natural gas stream, and wherein the heavy hydrocarbons comprise at least one of propane, butane, hexane, and heptane.

7. The fractionation system of claim 1, further comprising:
    a plurality of co-current contacting systems connected in series, said plurality of co-current contacting systems including the first and second co-current contacting systems and a last co-current contacting system; and
    a reflux drum configured to receive a vapor phase from the last co-current contacting system and separate a reflux liquid from said vapor phase;
    wherein the last co-current contacting system comprises
        a co-current contactor including a droplet generator and a mass transfer section, the droplet generator configured to generate droplets from the reflux liquid and to disperse the droplets into a gas stream received from a previous co-current contacting system, and the mass transfer section configured to provide a mixed, two-phase flow having a vapor phase and a liquid phase; and
        a separation system configured to separate the vapor phase from the liquid phase, wherein the vapor phase is sent to the reflux drum and the liquid phase comprises the liquid from which droplets are generated in a co-current contactor of a previous co-current contacting system.

8. The fractionation system of claim 7, further comprising a reflux cooler situated between the last co-current contacting system and the reflux drum, the reflux cooler configured to cool the vapor phase of the last co-current contacting system prior to being sent to the reflux drum.

9. The fractionation system of claim 1, wherein the droplet generator in the co-current contactor in at least one of the first and second co-current contacting systems comprises:
   an annular support ring securing the droplet generator in-line within the pipe;
   a plurality of spokes extending from the annular support ring, the annular support ring having a plurality of liquid channels configured to allow a liquid stream to flow through the plurality of spokes and out of injection orifices disposed on the plurality of spokes; and
   a gas entry cone supported by the plurality of spokes and configured to allow
      a first portion of the predominantly vapor phase of the feed gas stream to flow through a hollow section of the gas entry cone and through gas exit slots included in the plurality of spokes, and
      a second portion of the predominantly vapor phase of the feed gas stream to flow around the gas entry cone and between the plurality of spokes, wherein the second portion of the gas stream is separate from the first portion of the gas stream.

10. The fractionation system of claim 9, wherein a downstream portion of the gas entry cone comprises a blunt ended cone.

11. The fractionation system of claim 9, wherein a downstream portion of the gas entry cone comprises a tapered ended cone.

12. A method of removing heavy hydrocarbons in a gas stream, comprising:
   introducing a feed gas stream into a feed gas inlet, wherein the feed gas stream is subsequently separated into a predominantly liquid phase and a predominantly vapor phase;
   receiving the predominantly liquid phase of the feed gas stream into a stripping section;
   receiving the predominantly vapor phase of the feed gas stream into a first co-current contacting system located in-line within a pipe with a second co-current contacting system, each of the first and second co-current contacting systems comprising a co-current contactor including a droplet generator and a mass transfer section, and a separation system;
   using each droplet generator, generating droplets from a liquid and dispersing the droplets into a gas stream;
   in each mass transfer section, providing a mixed, two-phase flow having a vapor phase and a liquid phase; and
   in each separation system, separating the vapor phase from the liquid phase;
   wherein the second co-current contacting system is configured to receive the vapor phase of the co-current contactor in the first co-current contacting system, and wherein the droplet generator of the first co-current contacting system is configured to receive the liquid phase of the co-current contactor in the second co-current contacting; and further comprising:
   receiving the predominantly vapor phase of the feed gas stream in an in-line flash separator prior to sending the predominantly vapor phase through the first co-current contacting system; and
   separating liquids from the predominantly vapor phase in the in-line flash separator.

13. The method of claim 12, wherein the droplet generator in the co-current contactor in at least one of the first and second co-current contacting systems includes an annular support ring securing the droplet generator in-line within the pipe, a plurality of spokes extending from the annular support ring, and a gas entry cone supported by the plurality of spokes, the method further comprising:
   flowing a liquid stream through liquid channels disposed in the annular support ring, through the plurality of spokes, and out of injection orifices disposed on the plurality of spokes; and
   flowing a first portion of the predominantly vapor phase of the feed gas stream through a hollow section of the gas entry cone and through gas exit slots included in the plurality of spokes, and
   flowing a second portion of the predominantly vapor phase of the feed gas stream around the gas entry cone and between the plurality of spokes, wherein the second portion of the gas stream is separate from the first portion of the gas stream.

14. The method of claim 12, further comprising:
   conveying liquids separated from the predominantly vapor phase in the in-line flash separator to the stripping section via a flash reflux line.

15. The method of claim 12, further comprising:
   feeding the predominantly vapor phase of the feed gas stream into an agglomerator prior to the predominantly vapor phase of the feed gas stream being received by the in-line flash separator.

16. The method of claim 12, further comprising:
   arranging a plurality of co-current contacting systems in series, the plurality of co-current contacting systems including the first and second co-current contacting systems and a last co-current contacting system that has a co-current contactor and a separation system, wherein the co-current contactor of the last co-current contacting system has a droplet generator and a mass transfer section;
   in a reflux drum, separating a vapor phase of the last co-current contacting system from a reflux liquid;
   generating droplets from the reflux liquid in the droplet generator of the co-current contactor of the last co-current contacting system;
   dispersing said droplets into a gas stream received from a previous co-current contacting system;
   in the mass transfer section of the co-current contactor of the last co-current contacting system, providing a mixed, two-phase flow having a vapor phase and a liquid phase;
   in the separation system of the co-current contactor of the last co-current contacting system, separating the vapor phase from the liquid phase of the mixed, two-phase flow;
   sending the vapor phase of the mixed, two-phase flow to the reflux drum; and
   using the liquid phase of the mixed, two-phase flow to generate droplets in a co-current contactor of a previous co-current contacting system.

17. The method of claim 16, further comprising:
   cooling the vapor phase of the mixed, two-phase flow generated by the separation system of the co-current contactor of the last co-current contacting system prior to sending said vapor phase to the reflux drum.

18. A fractionation system for removing heavy hydrocarbons in a gas stream, comprising:
- a feed gas inlet through which a feed gas stream is introduced, the feed gas comprising a natural gas stream, wherein the feed gas stream is subsequently separated into a predominantly liquid phase and a predominantly vapor phase;
- a stripping section configured to receive the predominantly liquid phase of the feed gas stream;
- first and second co-current contacting systems located in-line within a pipe, the first co-current contacting system configured to receive the predominantly vapor phase of the feed gas stream, each of the first and second co-current contacting systems comprising:
  - a co-current contactor including a droplet generator and a mass transfer section, the droplet generator configured to generate droplets from a liquid and to disperse the droplets into a gas stream, and the mass transfer section configured to provide a mixed, two-phase flow having a vapor phase and a liquid phase, wherein the droplet generator includes
    - an annular support ring securing the droplet generator in-line within the pipe;
    - a plurality of spokes extending from the annular support ring, the annular support ring having a plurality of liquid channels configured to allow a liquid stream to flow through the plurality of spokes and out of injection orifices disposed on the plurality of spokes; and
    - a gas entry cone supported by the plurality of spokes and configured to allow
      - a first portion of the predominantly vapor phase of the feed gas stream to flow through a hollow section of the gas entry cone and through gas exit slots included in the plurality of spokes, and
      - a second portion of the predominantly vapor phase of the feed gas stream to flow around the gas entry cone and between the plurality of spokes, wherein the second portion of the gas stream is separate from the first portion of the gas stream; and
  - a separation system configured to separate the vapor phase from the liquid phase;
  wherein the second co-current contacting system is configured to receive the vapor phase of the co-current contactor in the first co-current contacting system, and wherein the droplet generator of the first co-current contacting system is configured to receive the liquid phase of the co-current contactor in the second co-current contacting system;
- an in-line flash separator arranged to receive the predominantly vapor phase of the feed gas stream prior to said predominantly vapor phase being sent through the first co-current contacting system, the in-line flash separator configured to separate liquids from the predominantly vapor phase; and
- a flash reflux line connected to the in-line flash separator and to the stripping section, the flash reflux line configured to convey liquids separated from the predominantly vapor phase in the in-line flash separator to the stripping section.

\* \* \* \* \*